US008191910B2

(12) United States Patent
Landau et al.

(10) Patent No.: US 8,191,910 B2
(45) Date of Patent: Jun. 5, 2012

(54) CONTAINERS AND CONTAINER SYSTEM

(75) Inventors: Eitan Landau, Ramat Gan (IL); Amir Katz, Bat-heffer (IL)

(73) Assignee: The Stanley Works Israel Ltd., Rosh Ha'Ayin (IL)

(*) Notice: Subject to any disclaimer, the term of this patent is extended or adjusted under 35 U.S.C. 154(b) by 230 days.

(21) Appl. No.: 12/081,369

(22) Filed: Apr. 15, 2008

(65) Prior Publication Data

US 2009/0256454 A1 Oct. 15, 2009

(51) Int. Cl.
*B62B 3/02* (2006.01)

(52) U.S. Cl. ................. 280/47.35; 280/79.3; 211/85.17; 220/23.6

(58) Field of Classification Search ............. 280/33.998, 280/651, 47.18, 47.19, 47.26, 79.11, 79.2, 280/79.3; 211/85.17; 220/23.6; 206/503, 206/509
See application file for complete search history.

(56) References Cited

U.S. PATENT DOCUMENTS 542,955 A 7/1895 Feely
1,326,809 A 12/1919 Twiss
1,676,908 A 7/1928 Levene
1,862,609 A 10/1930 Shaw
2,237,176 A 4/1941 Dorman
2,525,208 A 10/1950 Clink
2,604,334 A 7/1952 Schultz
2,727,543 A 12/1955 Polselli
2,805,910 A 9/1957 Townsend
2,981,549 A 4/1961 Hotton
3,036,608 A 5/1962 Weber
3,899,228 A 8/1975 Schreiber
4,120,549 A 10/1978 Bureau
4,219,268 A 8/1980 Uchida
4,302,023 A 11/1981 Kiesz
4,373,761 A 2/1983 Hansberry, Jr.
4,733,703 A 3/1988 Cimino
4,984,704 A * 1/1991 O'Malley ..................... 220/23.4
4,988,003 A * 1/1991 Spitzer et al. ................. 206/511
5,016,948 A 5/1991 Welch et al.
5,167,336 A * 12/1992 Lajovic ......................... 220/23.6
5,375,709 A * 12/1994 Petro ............................. 206/709
5,518,310 A 5/1996 Ellman et al.
5,564,803 A 10/1996 McDonald et al.
5,634,649 A 6/1997 Breining et al.
5,676,251 A * 10/1997 Credle, Jr. ..................... 206/501
(Continued)

FOREIGN PATENT DOCUMENTS

GB 2 253 180 9/1992
(Continued)

OTHER PUBLICATIONS

Partial Search Report as issued for European Patent Application No. 09155847.8, dated Nov. 24, 2010.

*Primary Examiner* — Jeffrey J Restifo
(74) *Attorney, Agent, or Firm* — Pillsbury Winthrop Shaw Pittman LLP

(57) ABSTRACT

A container assembly, comprises a container, at least one compartment constructed and arranged to be carried by the container, a plurality of extendable legs operatively connected with the container, and a lock assembly. The at least one compartment is configurable between an open configuration and a closed configuration. The plurality of extendable legs support the container at a selected height. The lock assembly locks the legs and hence the container at the selected height.

45 Claims, 29 Drawing Sheets

U.S. PATENT DOCUMENTS 5,699,925 A * 12/1997 Petruzzi .................... 220/4.27
5,725,037 A 3/1998 Faulhaber
5,772,236 A * 6/1998 Clark .................... 280/651
5,887,878 A * 3/1999 Tisbo et al. .................... 280/47.19
6,047,750 A 4/2000 Jensen
6,050,660 A 4/2000 Gurley
6,053,587 A * 4/2000 Boerder .................... 312/249.12
6,079,719 A * 6/2000 Tisbo et al. .................... 280/47.35
6,135,706 A * 10/2000 Marti et al. .................... 414/812
6,142,301 A * 11/2000 Lin et al. .................... 206/511
6,394,471 B1 * 5/2002 Watson .................... 280/47.19
6,547,264 B1 4/2003 Blackburn
6,688,615 B2 * 2/2004 Chen .................... 280/47.35
6,732,858 B1 * 5/2004 Chang Ou .................... 206/278
6,983,946 B2 * 1/2006 Sullivan et al. .................... 280/79.11
7,044,483 B2 * 5/2006 Robertson et al. .................... 280/33.998
7,044,569 B1 5/2006 Relyea et al.
7,134,673 B2 * 11/2006 Ferraro et al. .................... 280/33.991
7,210,689 B2 5/2007 Guirlinger
7,213,817 B2 * 5/2007 Cheung .................... 280/42
7,246,779 B2 7/2007 Doyle
7,594,668 B2 * 9/2009 Arceta et al. .................... 280/47.35
7,607,550 B2 * 10/2009 Lin et al. .................... 220/252
7,686,179 B2 * 3/2010 Chen .................... 220/4.27
2002/0185941 A1 12/2002 Ferraro et al.
2004/0261889 A1 12/2004 Elgan et al.
2005/0073119 A1 * 4/2005 Kirakosyan .................... 280/47.26
2005/0077695 A1 * 4/2005 Sherer et al. .................... 280/79.5
2005/0098459 A1 5/2005 Gorman
2005/0140106 A1 6/2005 Huguet
2005/0161357 A1 7/2005 Allan et al.
2005/0248109 A1 11/2005 Chang
2006/0152114 A1 7/2006 Yamada
2006/0220501 A1 10/2006 Robertson
2007/0103039 A1 5/2007 Holcomb et al.
2007/0187913 A1 8/2007 Cheung
2009/0256454 A1 * 10/2009 Landau et al. .................... 312/249.11
2009/0261549 A1 * 10/2009 Kral .................... 280/47.35

FOREIGN PATENT DOCUMENTS

WO WO 2007/067160 6/2007

* cited by examiner

CONTAINERS AND CONTAINER SYSTEM

BACKGROUND OF THE INVENTION

Field of the Invention

The present invention relates to a container system and compartments carried by a container in the container system.

A storage container system with plurality of compartments is known for storing articles, such as tools. The present invention relates to a mechanical system that can raise or lower a storage container system to selected heights. Further, the present invention relates to convenient compartments that can be used in the container system or can be used independently to conveniently carry tools or articles from one place to another.

SUMMARY OF THE INVENTION

One aspect of the invention relates to a container assembly. The container assembly comprises a container, at least one compartment constructed and arranged to be carried by the container, a plurality of extendable legs operatively connected with the container, and a lock assembly. The at least one compartment is configurable between an open configuration and a closed configuration. The legs supports the container at a selected height. The lock assembly locks the legs and hence locks the container at the selected height.

Another aspect of the invention relates to a storage compartment. The storage compartment comprises a pair of side walls disposed generally parallel to one another and providing a guide, a base wall extending between the side walls, a flexible closure slidably mounted on the guide, and a handle. The base wall and the side walls cooperating to define, at least in part, a space within the compartment. The compartment has an opening to access the space. The flexible closure movable along the guide between a first position wherein it substantially covers the opening and a second position wherein it exposes the opening. The handle connected to at least one of the walls to enable the storage compartment to be transported.

Another aspect of the invention relates to a container assembly. A container assembly, comprising a container, and at least one compartment constructed and arranged to be carried within the container. The at least one compartment comprising a pair of side walls; a base wall extending between the side walls, the base wall and the side walls cooperating to define, at least in part, a space within the compartment, the compartment having an opening to access the space; a closure movable between a first position in which it substantially covers the opening and a second position wherein it exposes the opening; and a handle, operatively connected to at least one of the walls to enable the storage compartment to be transported. The at least one compartment and the container comprise a cooperative releasable lock assembly constructed and arranged to releasably lock the compartment within the container. The releasable lock assembly comprises a spring that biases the at least one compartment outwardly from the container when the lock assembly is released.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 16C-16F illustrate a plurality of storage compartments shown in a stacked, nesting position in accordance with an alternate embodiment of the invention, wherein FIG. 16C is a front view; FIG. 16D is a left side view; FIG. 16E is a rear view; and FIG. 16F is a perspective view;

FIGS. 20-22 illustrate an alternate embodiment, wherein FIG. 20 is a front view of a storage compartment placed inside the container in accordance with the alternate embodiment;

FIG. 21 is a perspective view of the storage compartment placed inside the container in accordance with the alternate embodiment;

DETAILED DESCRIPTION OF THE INVENTION

Figure 1:
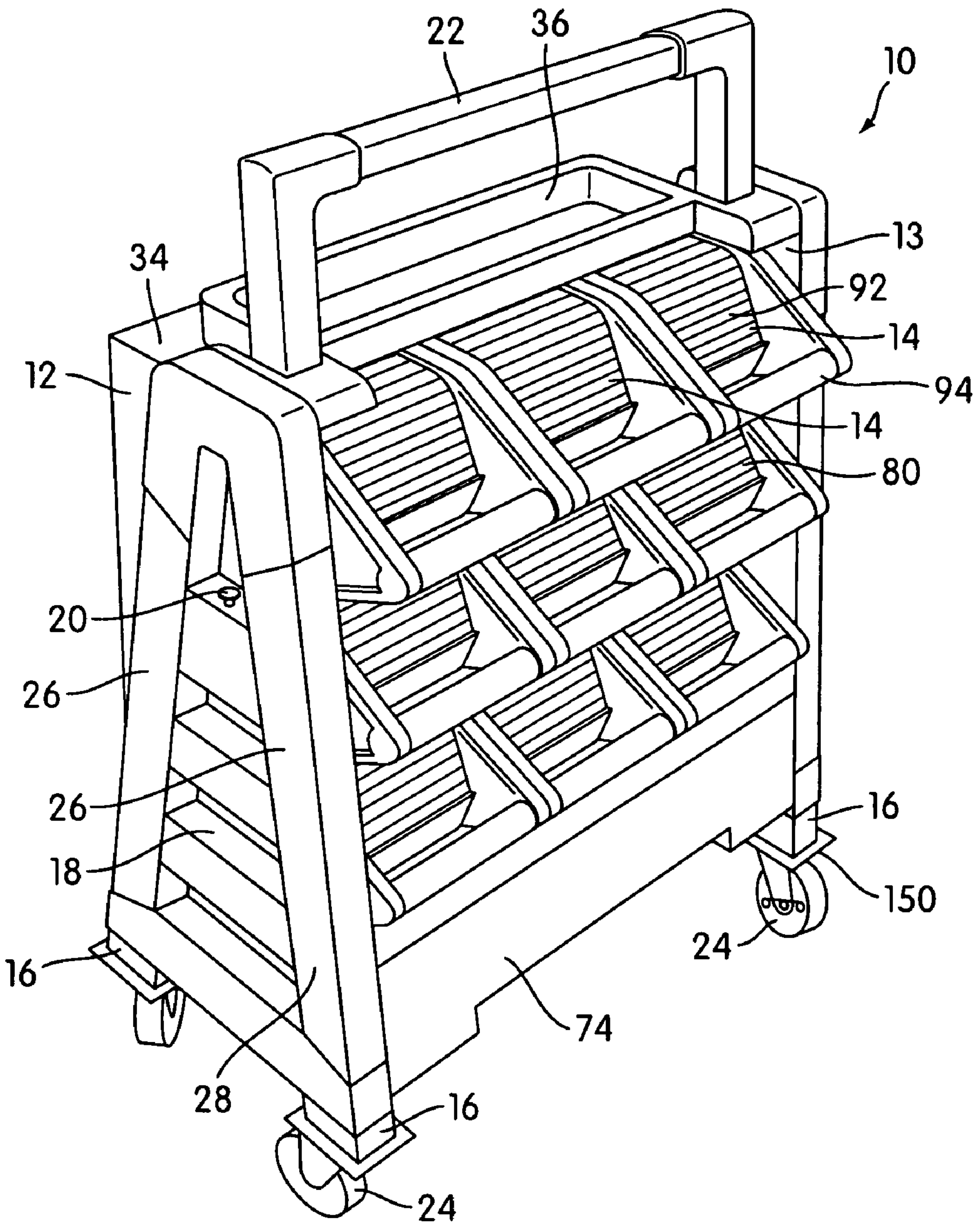
FIG. 1 is a perspective view of the container assembly in accordance with an embodiment of the present invention.
Figure 2:
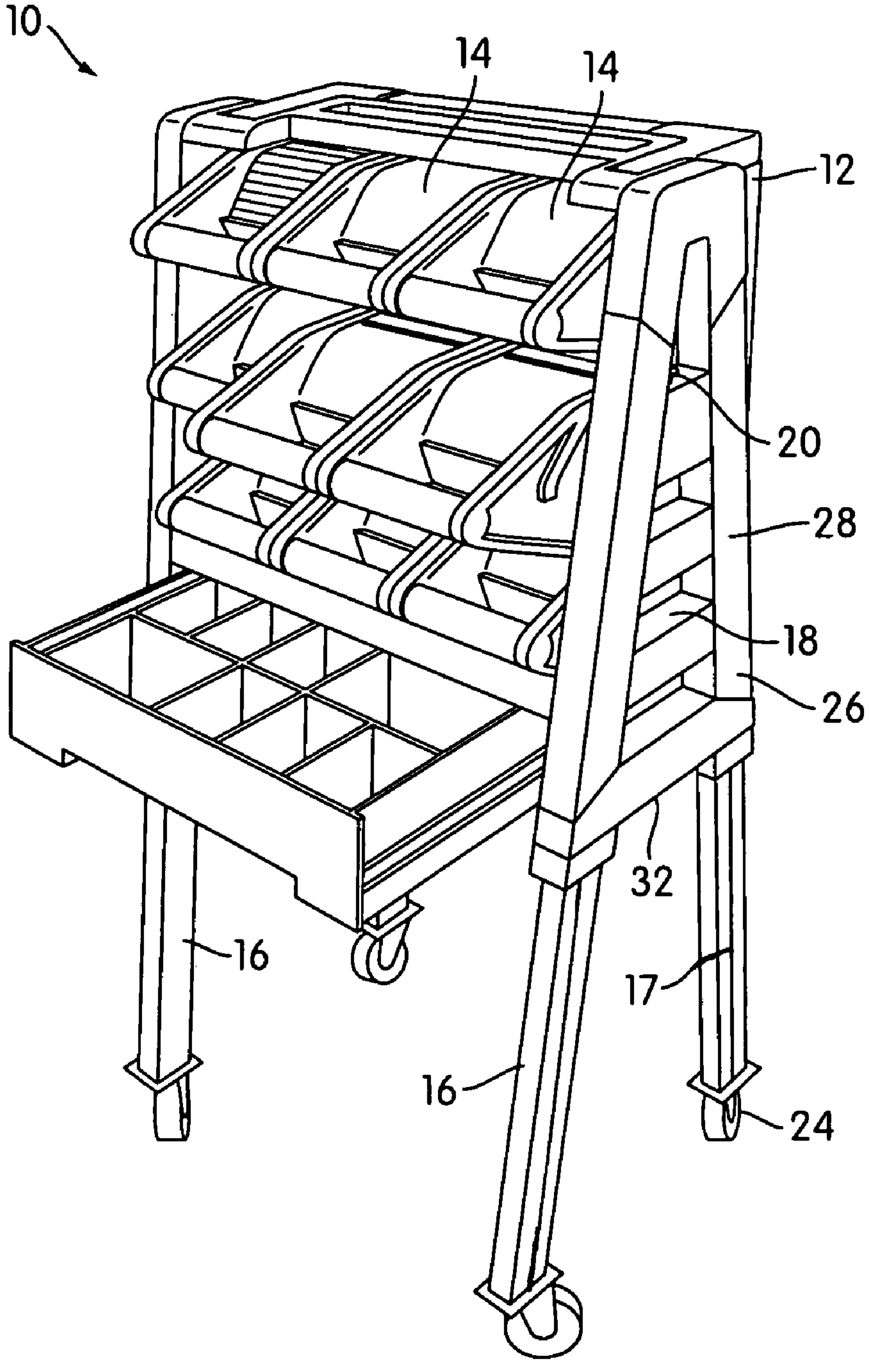
FIG. 2 is a perspective view of the container assembly in an elevated position in accordance with an embodiment of the present invention.

FIGS. 1 and 2 show a container assembly 10 in accordance with an embodiment of the present invention. The container assembly 10 may generally include an outer container 12, one or more compartments 14 constructed and arranged to be carried by the container 12, a plurality of extendable legs 16 that are operatively connected with the container 12, and a lock assembly 18. The compartments 14 are each configured to be open and closed. The legs 16 are configured to support the container 12 at a selected height. The lock assembly 18 locks the container 12 at the selected height. In one embodiment, the lock assembly 18 includes a manually engageable member 20 that is movable between a first position and a second position. The movement of the manually engageable member 20 from a first position to a second position unlocks the lock assembly 18 to enable longitudinal movement of the legs 16.

FIG. 1 shows the container assembly 10 in a storage configuration. In the storage position, the container assembly 10 is compact (legs 16 are not extended). The container assembly 10 can be transported either by lifting the container assembly 10 by using a handle 22 or by simply rolling the container assembly 10 on roller members 24, such as wheels or casters. FIG. 2 shows the container assembly 10 in an elevated position. In the elevated position, the container 12 is elevated to a selected height and is locked in this position by the lock assembly 18. In the elevated position, the container assembly 10 may facilitate access to the articles stored in the compartments 14, which are carried by the container 12.

In one embodiment, as shown in FIG. 1, the container 12 of the container assembly 10 is generally rectangular in shape. However, any convenient shape may be used. The container 12 includes an opening 13 on at least one side thereof constructed and arranged to receive the one or more compartments 14. In one embodiment, the container 12 includes internal tracks within opening 13 for receiving the compartments 14. The tracks can be used to guide the compartments for linear sliding movement at discreet locations within the opening 13. Alternatively, in another embodiment, the container 12 includes simple smooth shelves for receiving the compartments 14. The tracks, if provided, can be located on the inner surfaces of the side walls of the container 12, within opening 13. In another embodiment, horizontal shelves may extend between the side walls of the container 12 and from the open front toward a closed rear of the container 12. These plurality of horizontal shelves are constructed and arranged to accommodate plurality of compartments, such as storage compartment 14. The compartments 14 can all be of the same size and shape, or they can be of different configurations. In the embodiment illustrated, a plurality of smaller compartments 80 are provided and a larger drawer-like compartment 74 is also provided. In one embodiment, the smaller storage compartment 14 each includes a flexible closure 92 and a handle 94, as will be explained in more detail later.

The handle 22 is constructed and arranged to be attached to and to extend from the top surface 34 of the container 12. The handle 22 can be moved between a folded position, as can be clearly seen in FIG. 2, to an operating position, as shown in FIG. 1. In the folded position, the handle 22 is stored in a space surrounding a sorting tray 36 to fold flush with the top surface 34 of the container 12. In the operating position, the handle 22 is swung out upwards from the space located on the top surface 34 to transport the container assembly 10. The sorting tray 36 is adapted to sort paired components, such as nuts and bolts. A number of components, such as nuts, bolts, screws, and washers are dumped onto the sorting tray 36. These components can be quickly separated from each other or matched with each other, thus, the sorting tray 36 helps in quickly obtaining a matching nut, bolt, and washer.

In one embodiment, the container 12 of the container assembly 10 may be supported by at least three legs 16. In one embodiment, the legs 16 are made from heavy metallic material, such that the legs 16 extend downwardly from the container 12 due to gravity when the lock assembly 18 is unlocked and the container 12 is lifted. In one embodiment, the roller member 24 connected at the bottom of each leg is a wheel. The roller members 24 move freely to facilitate rolling movement of the container assembly 10 in any direction. The roller members 24 may be locked against rolling motion by lock members 150 to provide a stationary configuration.

The container assembly 10 comprises a pair of A-frames 28, where each A-frame 28 is formed by a pair of hollow members 26 that are constructed and arranged to outwardly diverge, from top to bottom of the container 12, in angular direction with respect to each other. Each A-frame 28 is attached to opposite side walls of the container 12. The hollow members 26 of the A-frame 28 are configured to slidingly receive accommodate the legs 16 therein.

In one embodiment, the container assembly 10 includes at least one lock assembly 18 for locking the legs such that the container can be retained at a selected height. In the illustrated embodiment, a pair of lock assemblies 18 is provided, one for each A-frame, wherein each lock assembly 18 is located on opposite sides of the container 12 (see FIGS. 1 and 2). In one embodiment, each lock assembly 18 includes a manually engageable member 20. The container assembly 10 is moved from the storage position, as shown in FIG. 1, to the elevated position, as shown in FIG. 2, by simultaneously pushing the manually engageable members 20 located on opposite sides of the container 12 from a first position to the second position, as will be appreciated by the discussions later. The movement of the manually engageable members 20 from the first position to a second position unlocks the lock assemblies 18 to enable telescopic, longitudinal movement of the legs 16 along their own axes. As the legs 16 extend downwardly from the container 12, the bottoms of the legs tend to diverge away from one another as a result of the angled relationships defined by the A-frames. As a result, as the container is raised, it is supported by a larger footprint. The roller members 24 at the bottom of legs 16 can roll along the floor surface so as to facilitate the movement of the bottom of the legs 16 away from each other during raising of the container 12 and facilitates movement of the bottom of legs toward one another during lowering of the container. The legs 16 can then be locked in the extended or retracted position as will be described.

Figure 3:
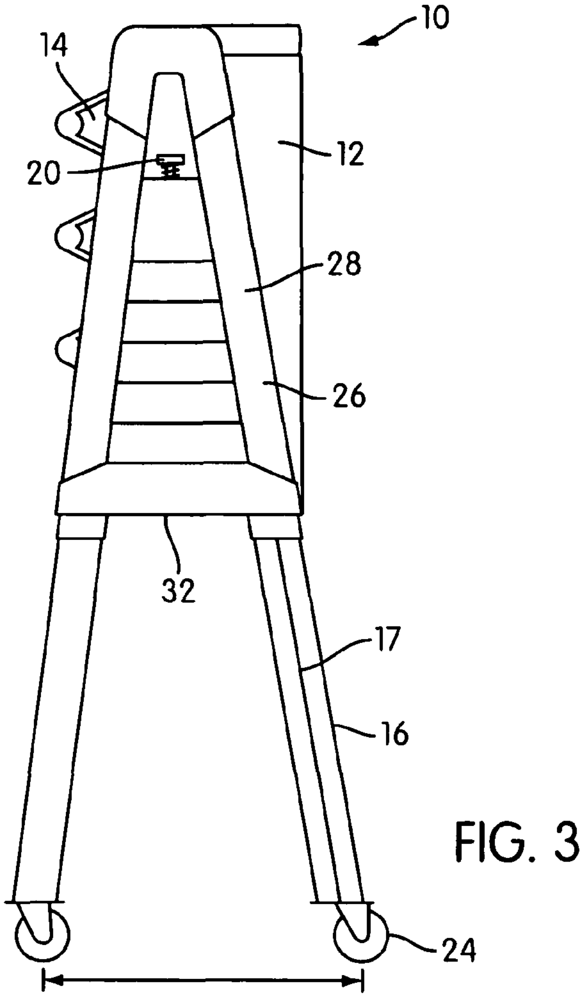
FIG. 3 is a side view of the container assembly in the elevated position in accordance with an embodiment of the present invention.

In the elevated position, as shown in FIGS. 2 and 3, the angularly diverging legs 16 are sized to define a foot print that is larger than a base portion 32 of the container 12. In contrast when the container assembly 10 is in the storage position, as shown in FIG. 1, the legs 16 of the container assembly 10 are in close proximity to each other, thereby defining a smaller foot print, approximating the size of the base wall 32 of the container 12, for compact storage of the container assembly 10. The larger foot print of the container assembly 10, when in the elevated position, provides improved stability for the container assembly 10. In one embodiment, each leg 16 includes a track 17 that further stabilizes and optionally limits the extent of the telescopic, longitudinal movement of the legs 16 within the hollow members 26 of the A-frame 28. In one embodiment, the track 17 comprises a slot provided in each leg 16, and a projection within each hollow member 26 is received in the slot.

Figure 4:
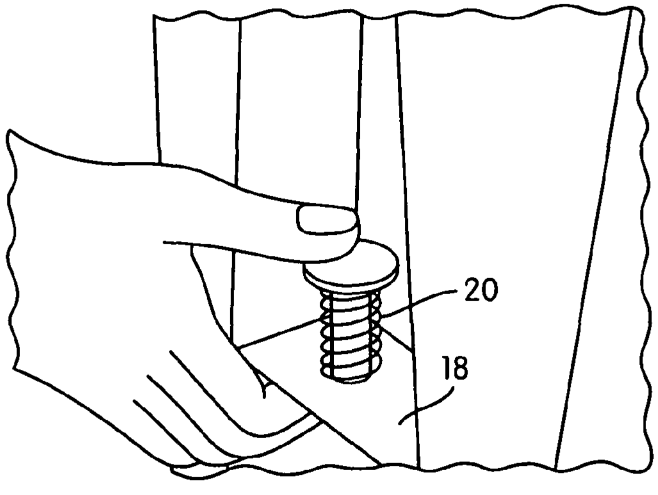
FIG. 4 is a perspective view of a manually engageable member of a lock assembly in accordance with an embodiment of the present invention.
Figure 5:
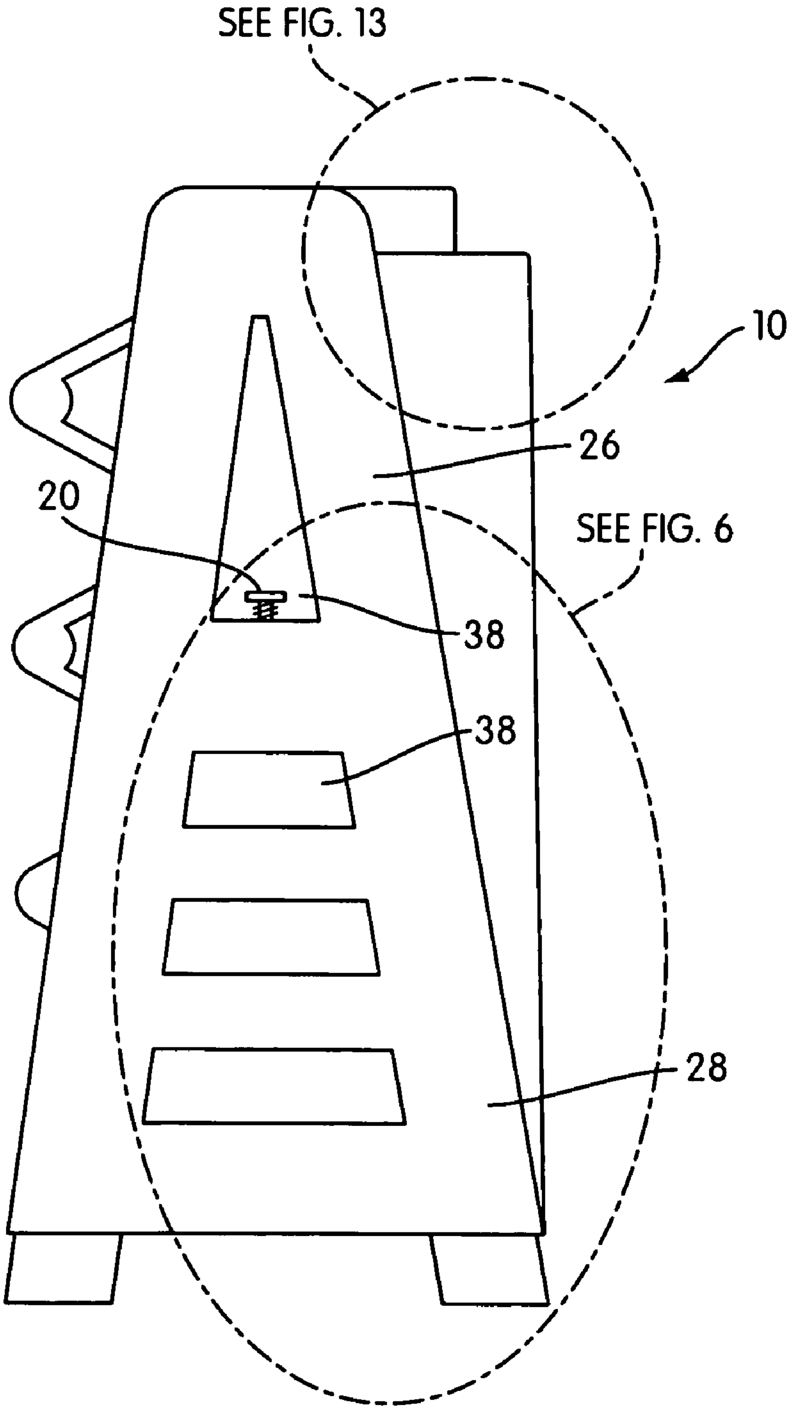
FIG. 5 is a side plan view of the container assembly in accordance with an embodiment of the present invention.

FIG. 4 shows the manually engageable member 20 of lock assembly 18 that is engaged and moved to unlock the lock assembly 18 to raise or lower the container 12. FIG. 5 shows the side view of the container assembly 10. In one embodiment, one or more cutout regions 38 are located in between the hollow members 26 of the A-frame 28. In one embodiment, one of the cutout region 38 is triangular. In one embodiment, the triangular cutout region 38 accommodates the manually engageable member 20.

Figure 6:
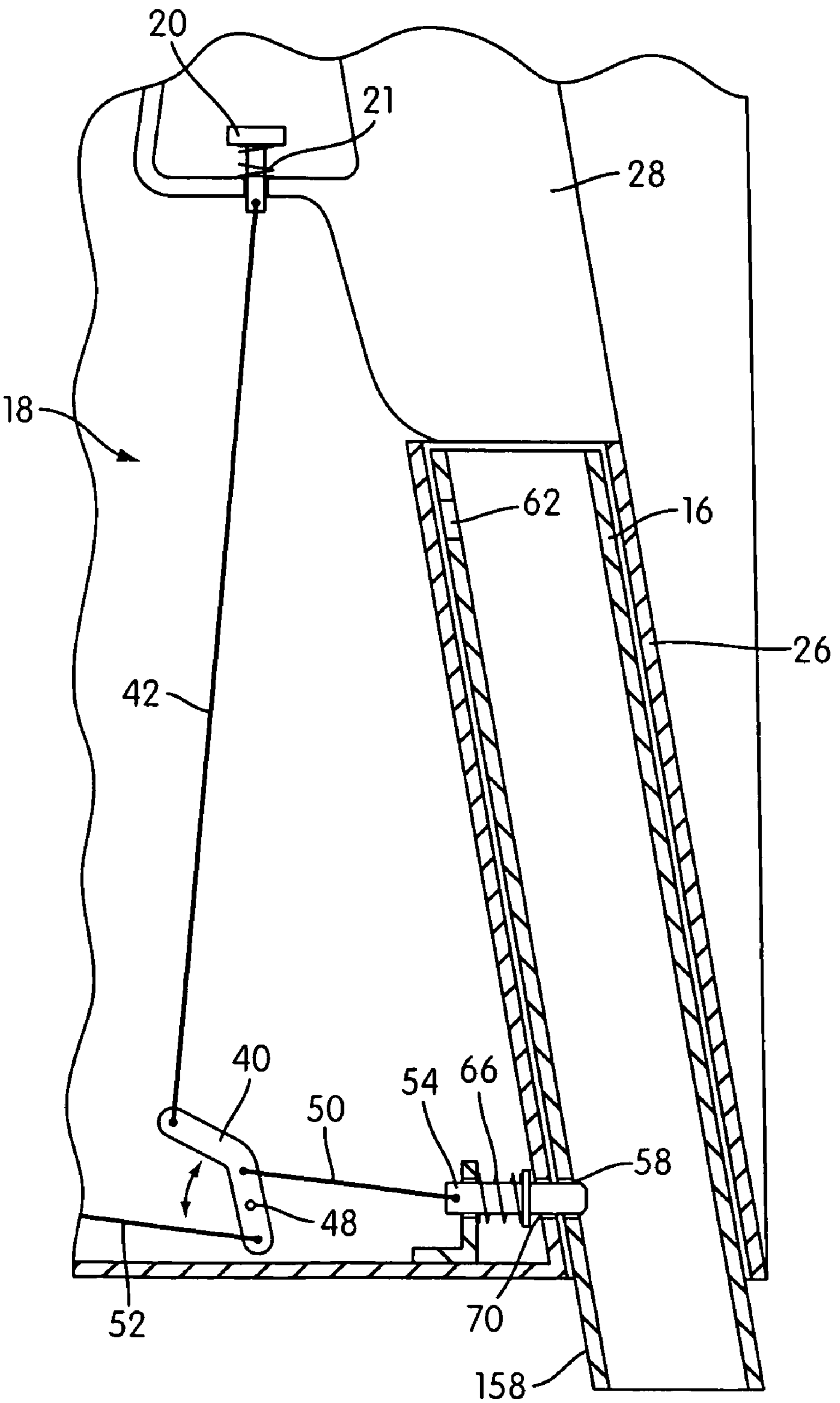
FIG. 6 is a detailed view of the lock assembly in accordance with an embodiment of the present invention.
Figure 7:
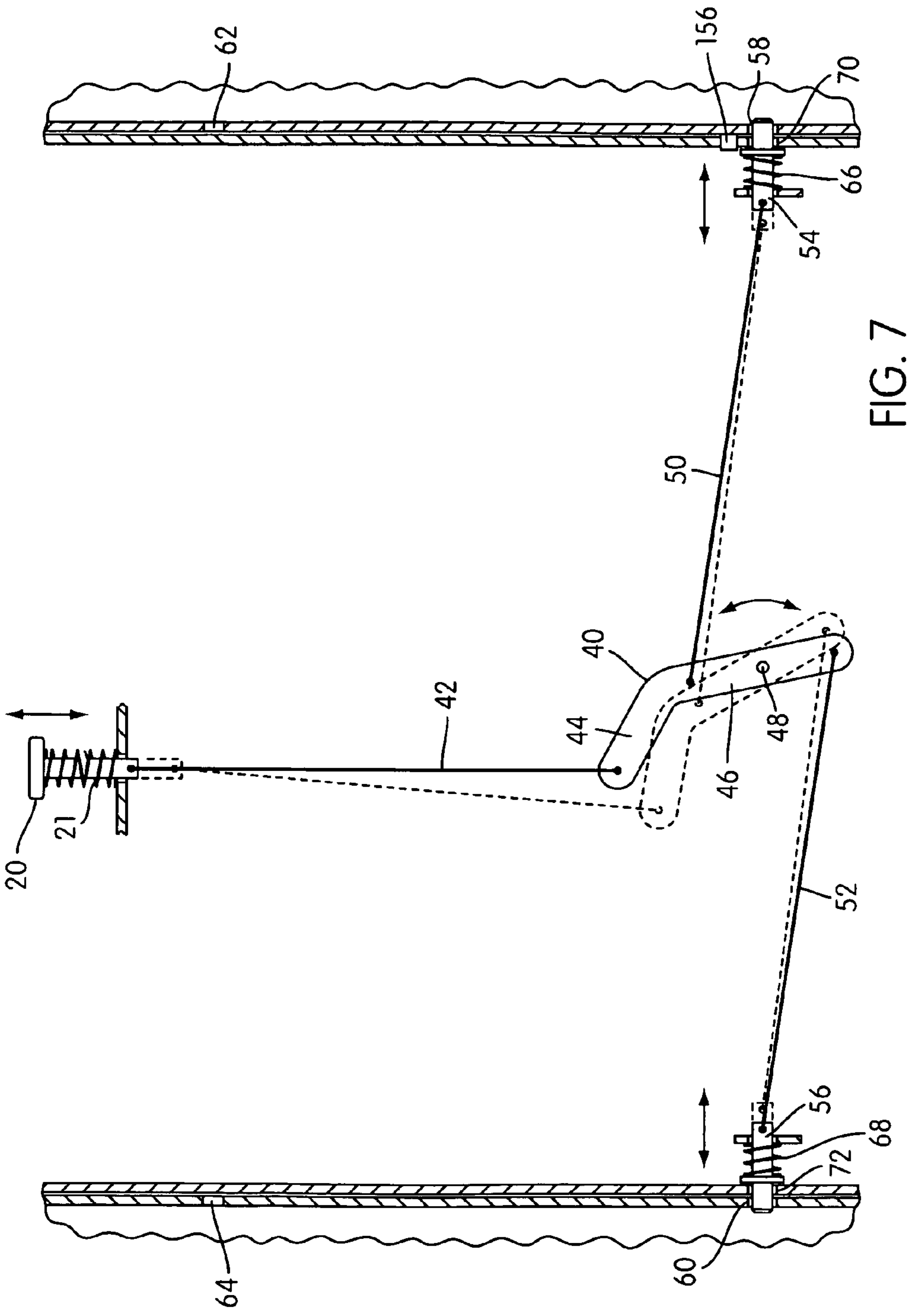
FIG. 7 is a schematic view of portions of the lock assembly in accordance with an embodiment of the present invention.

FIGS. 6 and 7 show the lock assembly 18 of the container assembly 10 that locks the container 12 at the selected height. As described above, the container assembly 10 comprises a pair of identical lock assemblies 18, and each lock assembly 18 is located on opposite side walls of the container 12, or may each be provided on a respective one of the A-frames 28. In one exemplary embodiment, each lock assembly 18 includes the aforementioned manually engageable member 20, a connecting member 42, a pivoting member 40, second connecting members 50, 52, pair of pins 54, 56 and pair of springs 66, 68.

In one embodiment, the manually engageable member 20 is held in first position by using a spring 21. The manually engageable member 20 is connected to the pivoting member 40 by using the connecting member 42. In one embodiment, the connecting member 42 is a rod that is made of rigid material (e.g., steel). The pivot member 40 is generally a L-shaped flat steel member having two legs 44 and 46. The pivot member 40 is configured to rotate about a pivot pin or axis 48. The pivot pin or axis 48 is located at midpoint of the leg 46. The connecting member 42 is pivotally connected at the outer end of the leg 44. The connecting member 42 translates the longitudinal movement of the manually engageable member 20 to the rotational movement of the pivot member 40 about the pivot axis 48. Each of the second connecting members 50, 52 are also rigid members (e.g., steel rods) that are pivotally connected to the pivot member 40, on opposite sides of the pivot axis 48. The second connecting member 50 connects with the pivot member 40 at the intersection of the two legs 44 and 46, while the second connecting member 52 connects with the pivoting member 40 at the outer end of the leg 46. The pair of pins 54, 56 are provided at the ends of the second connecting members 50 and 52 opposite from the pivoting member 40. The pair of pins 54, 56 may be integrally formed as part of the connecting members 50, 52, or can be separate members that are connected to the connecting members 50, 52. In one embodiment, the pins 54, 56 are capable of slight pivoting movement with respect to connecting members 50, 52 (e.g. through a limited angle pivotal connection therebetween). The pair of pins 54, 56 are configured to be received in either a first, lower pair of holes 58, 60 or a second, higher pair of holes 62, 64. The first pair of holes 58, 60 and the second pair of holes 62, 64 are located in the legs 16. The pair of pins 54, 56 are constructed and arranged to be received in the first pair of holes 58, 60 when the manually engageable member 20 is in a lower position, and to be received in the second pair of holes 62, 64 when the manually engageable member 20 is in a higher position, thus, locking the legs 16 at a selected height. The pair of pins 54, 56 are held inserted either in the first pair of holes 58, 60 or in the second pair of holes 62, 64 by springs 66, 68, respectively. Thus, the pair of springs 66, 68 are constructed and arranged to lock the lock assembly 18 at a selected height and to prevent longitudinal movement of the legs 16. A pair of holes 70, 72 are located in the hollow members 26 of the A-frame 28. The pair of holes 70, 72 are constructed and arranged to align with the lower holes 58, 60 to accommodate and to allow the pins 54, 56 to be inserted into the lower holes 58, 60, when the manually movable member 20 is in the lower position. The pair of holes 70, 72 are constructed and arranged to align with the upper holes 62, 64 to accommodate and to allow the pins 54, 56 to be inserted into the upper holes 62, 64, when the manually movable member 20 is in the upper position. In one embodiment, a stop 156 is located on the A-frame 28 to guide the pins 54, 56 to be inserted into either the first pair of holes 58, 60 or the second pair of holes 62, 64 respectively and to prevent the pins 54, 56 from traveling past the either the first pair of holes 58, 60 or the second pair of holes 62, 64 respectively.

The operation of the lock assembly 18 is discussed with reference to FIGS. 6 and 7. Each manually engageable member 20, located on opposite side walls of the container 12, is simultaneously pushed down from the first position to the second position against the bias of springs 21, 66, and 68. The longitudinal movement of the manually engageable member 20 is transferred to the pivot member 40 through the connecting member 42 causing the pivot member 40 to rotate in an anti-clockwise direction about the pivot point 48 (in the view illustrated in FIG. 6). The rotation of the pivot member 40 about the pivot point 48 pulls the second connecting members 50, 52 and the pair of pins 54, 56 attached to the second connecting members 50, 52 against the force of the springs 66, 68, thus, the pins 54, 56 are moved outwardly away from the first pair of holes 58, 60 unlocking the lock assembly 18. In this position, the pair of pins are manually held retracted within the pair of holes 70, 72 located in the hollow members 26 of the A-frame 28. Once the lock assembly 18 is unlocked, the legs 16 are able to extend downwardly from the container 12, due to gravity, as container 12 is manually lifted. The roller members 24 attached to the legs 16 facilitate the movement of the angularly diverging legs 16 away from each other during the raising of the container 12. Once the pins 54, 56 are withdrawn from holes 58, 60, and the legs are extended slightly so that the holes 58, 60 no longer align with holes 70, 72, the manually engageable members 20 can be released, and the force of springs 21, 66, and 68 will cause the pins 54, 56 to move outwardly from holes 70, 72 and engage the side surface 158 of legs 16 and slide along the surface until the pins 54, 56 become aligned with holes 62, 64. At this point, the bias of springs 21, 66, and 68 forces the pair of pins 54, 56 into the second pair of holes 62, 64 to lock the pair of pins 54, 56 at this selected height.

It should be appreciated that the lock assemblies 18 described above are just one example of the types of arrangements that can be provided. Any type of latch or lock can be used. While two locking positions (lower and upper) are illustrated, it can be appreciated that any number of locking holes can be provided to receive the locking pins for select placement of the container at any one of several different heights. The lock assembly 18 may, in another embodiment, optionally provide a continuous range of locking positions (locking heights), for example, by providing a spring biased locking structure with rubber feet or contacting portions for contacting the side of the legs 16 at any position along its extent of movement. Other arrangements, such as ratcheting arrangements or detent arrangements may also be provided. In yet another embodiment, a crank mechanism can be provided, which crank mechanism can be rotated in one direction for raising the container and rotated in an opposite direction for lowering the container. Other locking arrangements will be readily apparent to those skilled in the art, and the present invention contemplates a broad range of possibilities for such locking mechanism.

To subsequently lower the container 12, the manually engageable members 20 are again depressed against the bias of springs 21, 66, and 68 so that pins 54, 56 are withdrawn from the upper holes 62, 64, and the force of gravity moves container 12 downwards as the legs are retracted and the pins then find the lower holes 58, 60 are forced into the lower holes 58, 60 by the springs 21, 66, and 68.

Figure 8:
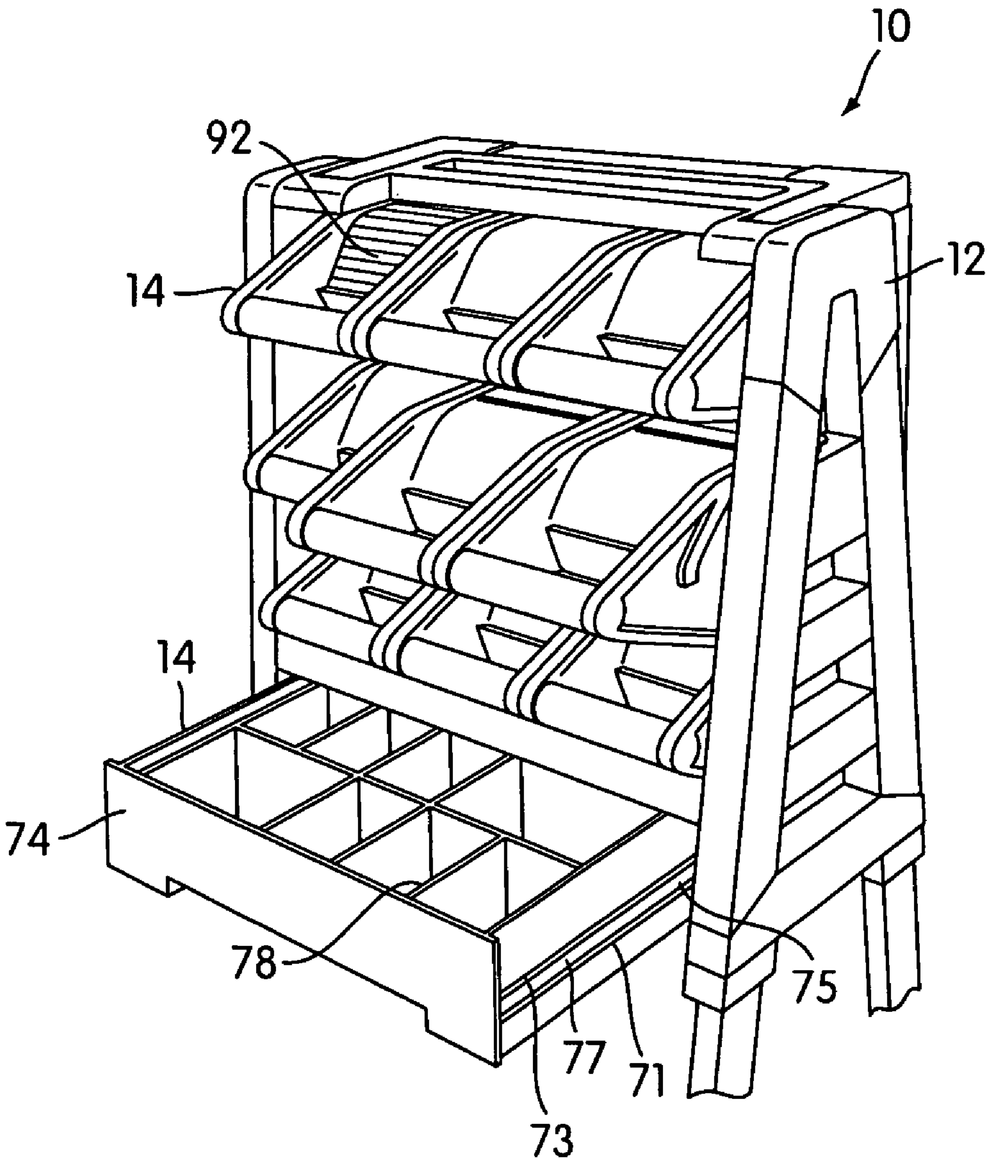
FIG. 8 is a perspective view of a plurality of compartments in the container assembly in accordance with an embodiment of the present invention.
Figure 9:
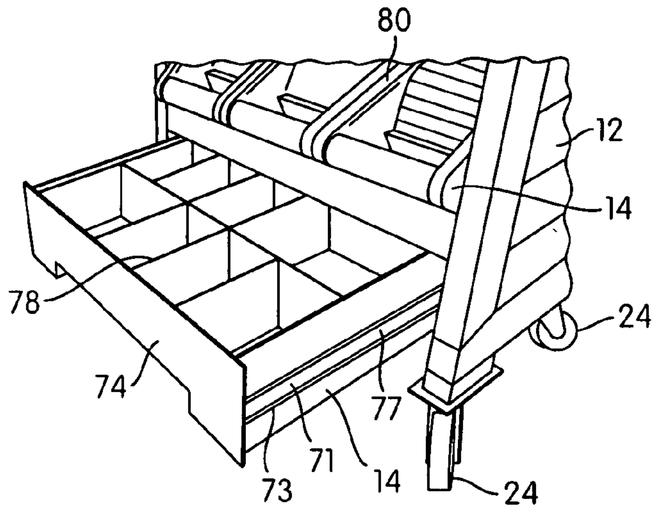
FIG. 9 is a perspective view of a drawer in the container assembly having been moved to an open position in accordance with an embodiment of the present invention.
Figure 10:
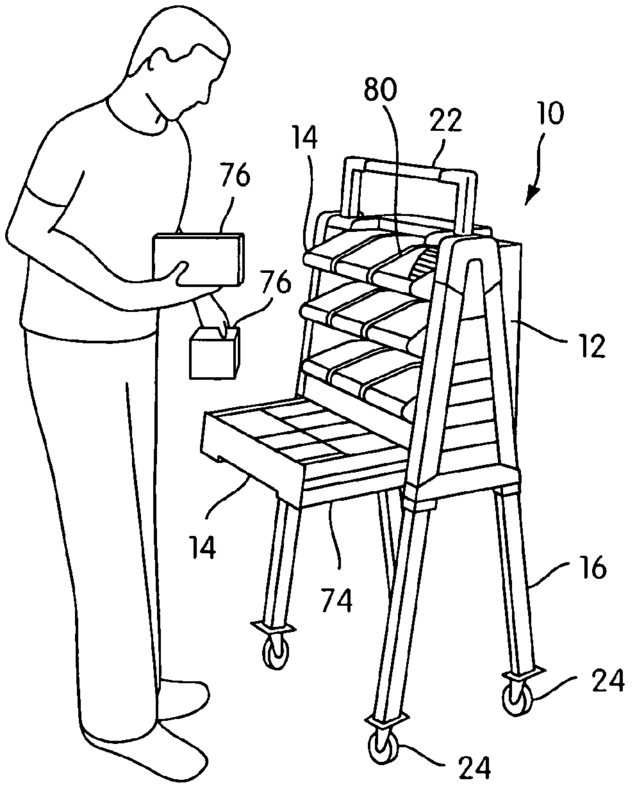
FIG. 10 is a perspective view of the drawer with removable bins in accordance with an embodiment of the present invention.

As shown in FIGS. 8-10, one or more compartments 14 are constructed and arranged to be carried by the container 12. As discussed earlier, the container 12 may include integral tracks or sliding openings for receiving the compartments 14. In one embodiment, as discussed above, the compartment 14 carried by the container 12 may take the form of a drawer 74. The drawer 74 is configured to be partially pulled out from the container 12 or fully removed from the container 12 to access the stored articles therewithin. A drawer slide 71, as clearly seen in FIGS. 9 and 10, is constructed and arranged to slideably support the drawer 74, between the open and the closed configuration, in the container 12. The drawer slide 71 includes two channels 73, 75 for slideably attaching the drawer slide 71 to the drawer 74 and the container 12, a plurality of bearings slideably retained in the channels 73, 75 by bearing retainers, and an intermediate slide member 77 as known in the art. A stop (not shown) may be provided to prevent the drawer 74 from being pulled entirely out of the container 12 while the drawer 74 is moved from the open configuration to the closed configuration.

In one embodiment, the drawer 74 is constructed and arranged to receive at least one removable bin 76 for receiving and storing articles. The removable bins 76 may be of different sizes to accommodate different size articles. In another embodiment, the interior of the drawer 74 is divided into at least two upwardly open sections by at least one removable dividing wall 78. These upwardly open sections may be of the same or different shape. The removable dividing walls 78 may be provided in different geometries to provide different numbers of sections and different configurations. Alternatively, the interior of the drawer 74 is subdivided by a removable, unitary partition structure into a plurality of upwardly open section of the same or different shape. The unitary partition structure may be provided in different geometries to provide different numbers of sections and different configurations. The removable bin 76 and removable dividing walls 78 may be made from a molded plastic material or any other plastic material as would be appreciated by one skilled in the art.

In one embodiment, one or more of the compartments 14 carried by the container 12 may take the form of storage compartment 80. As shown in FIG. 8, while placed in the container 12, the storage compartment 80 is capable of being partially pulled out from the container 12 to access the articles stored in the space therewithin. Even when fully pushed into container 12, in one embodiment, the contents of compartment 80 can be accessed. Specifically, while placed in the container 12, a flexible closure 92 of the storage compartment 80 can be opened to access the articles stored in the space therewithin and can be closed to secure articles within the storage compartment 80. In one embodiment, the flexible closure 92 of the storage compartment 80 may be provided with a lock as will be discussed in detail later with reference to FIGS. 11D-11G.

Figure 11A:
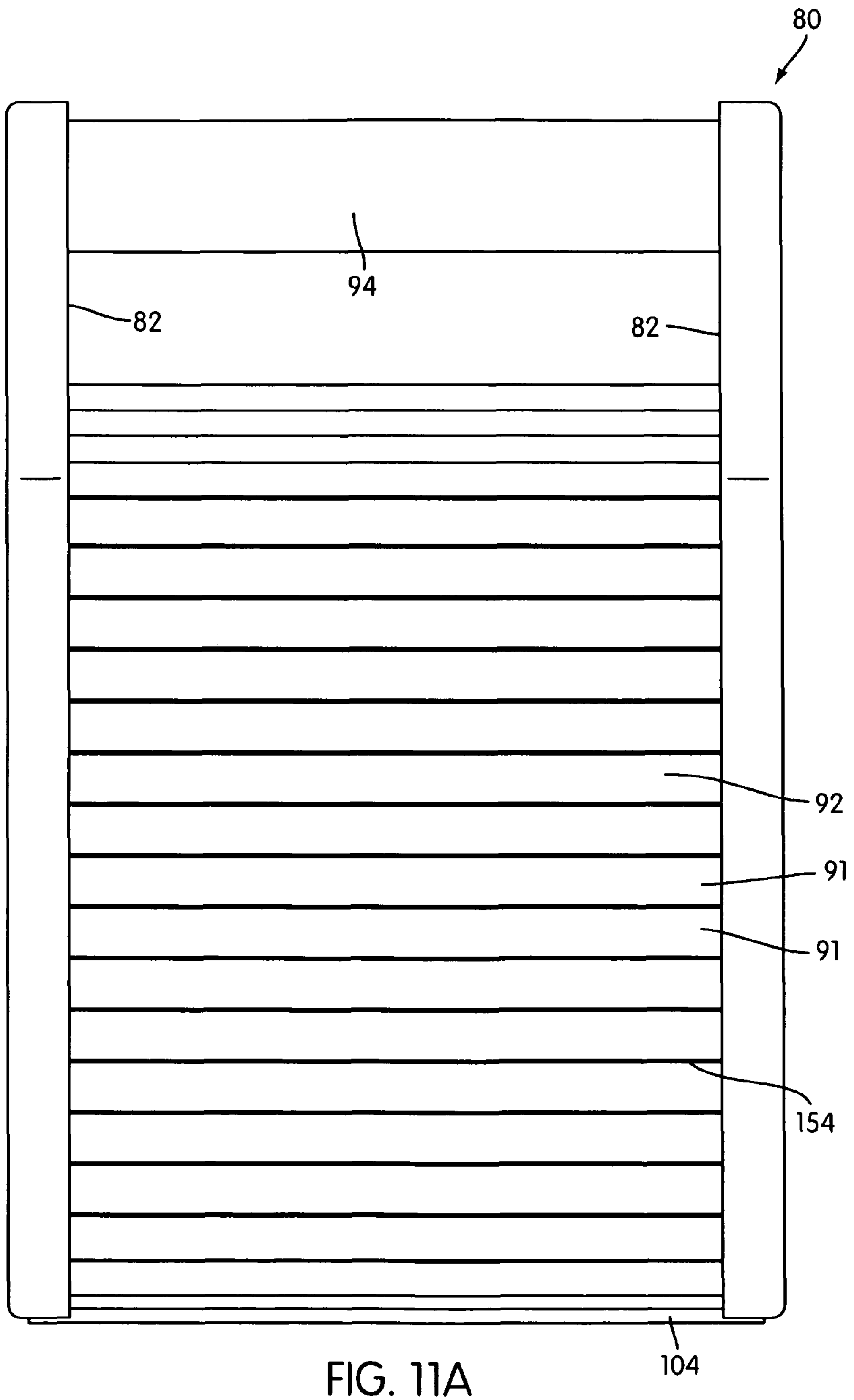
FIG. 11A is a top view of a storage compartment in accordance with an embodiment of the present invention.
Figure 11B:
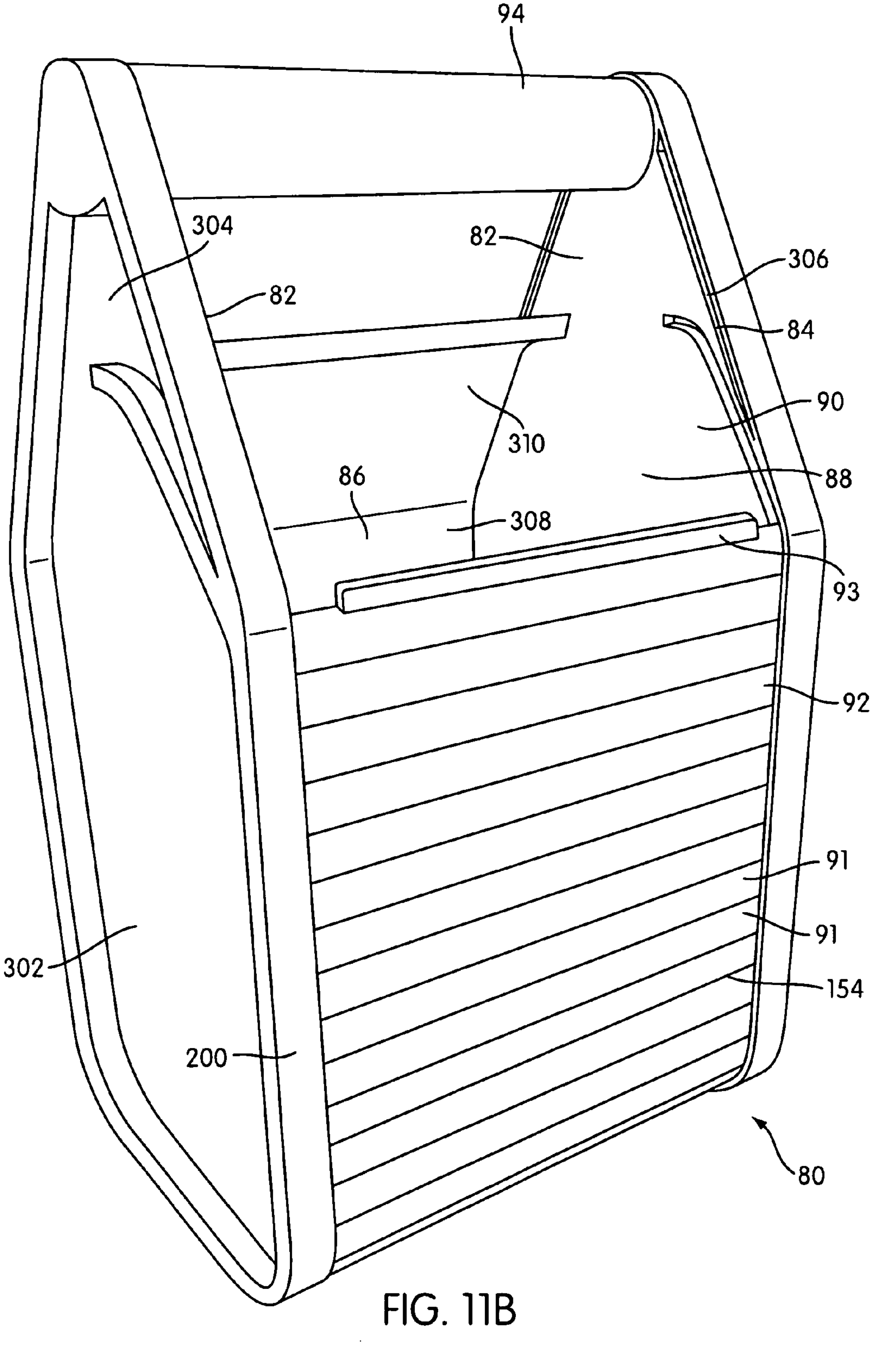
FIG. 11B is a side perspective view of a storage compartment in accordance with an embodiment of the present invention.
Figure 11C:
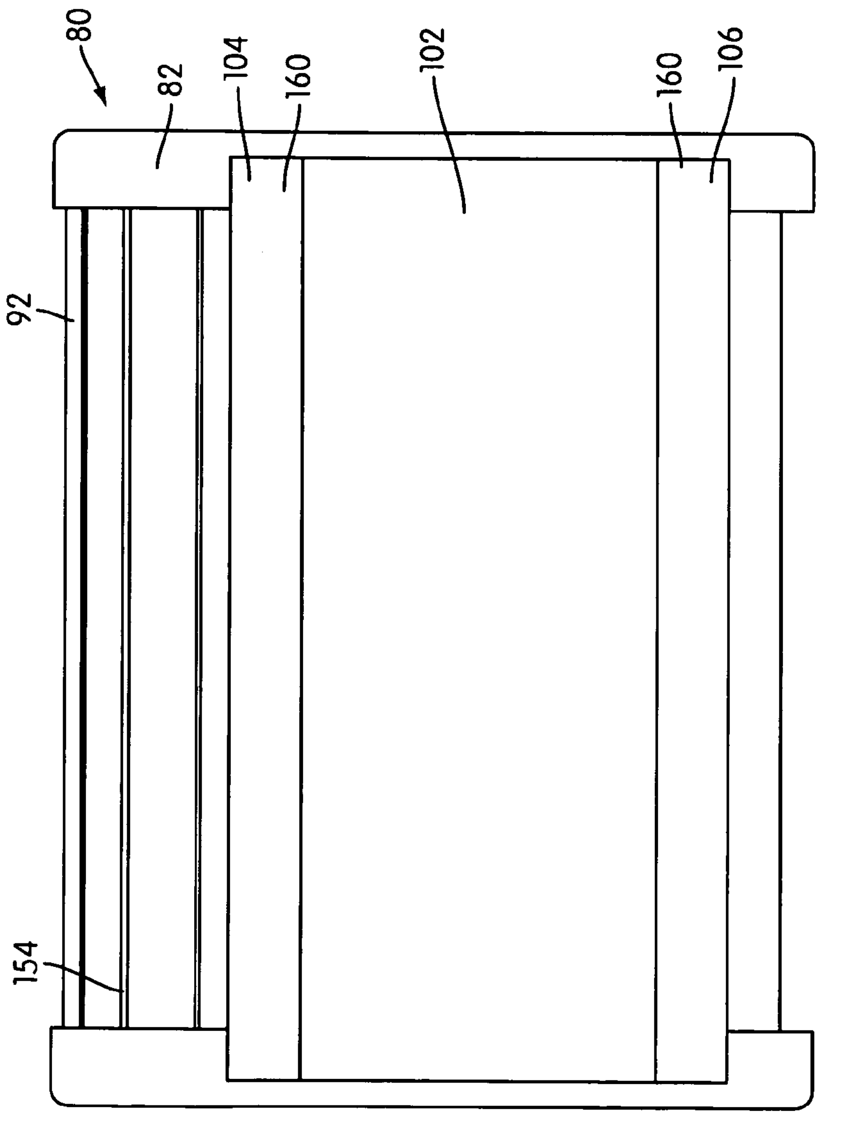
FIG. 11C is a rear view of a storage compartment in accordance with an embodiment of the present invention.
Figure 11D:
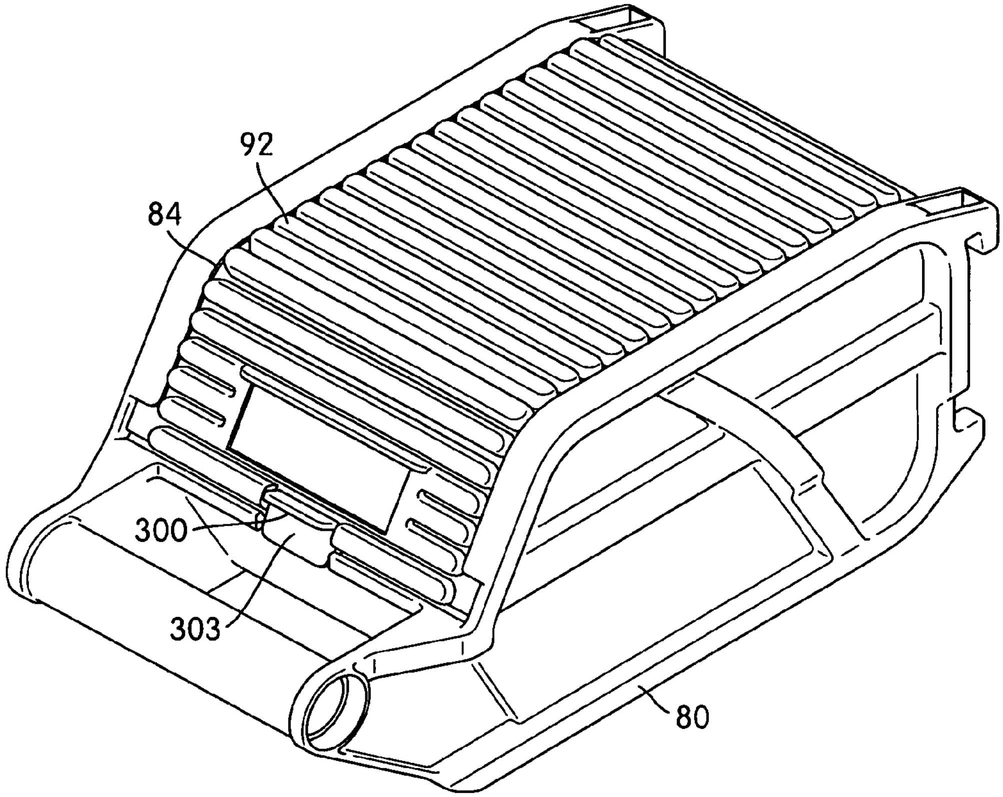
FIG. 11D is a perspective view of storage compartment in a locked position in accordance with another embodiment of the present invention.

The storage compartment 80, as shown in FIGS. 11A-11C, includes a pair of side walls 82 that are substantially identical, generally parallel to one another, and provide a guide or track 84 A base wall 86 extends between the side walls 82 and generally adjacent to the periphery of the side walls 82 along a portion of the periphery of the side walls 82. The base wall 86 and the side walls 82 cooperate with each other to define, at least in part, a space 88 within the storage compartment 80 so as to store articles therewithin. The storage compartment 80 has an opening 90, located on the top of the storage compartment 80, to access the articles that are stored in the space 88.

As shown in FIG. 11B, the side wall 82 includes a rectangular portion 302 and generally a triangular portion 304 extending from the rectangular portion 302. The base wall 86 includes a planar portion 308 and generally an angular portion 310 extending upwardly at an angle from the planar portion 308. While the planar portion 308 of the base wall 86 is connected with the rectangular portion 302 at the lower portion of the side wall 82, the angular portion 310 of the base wall 86 is connected with the triangular portion 304 of the side wall 82. The track or the guide 84 includes grooves 306 formed in the side walls 82 along the periphery. The grooves 306 are located outside the base wall 86 of the storage compartment 80. A protruding member 200 is attached along the periphery of the side wall 82 of the storage container and is explained in detail with respect to the FIG. 16A.

The flexible closure 92 is slidably mounted on the guide or track 84 that is formed on the inner surfaces of the opposite side walls 82 of the storage compartment 80 near the opening 90. The flexible closure 92 is movable along the track 84 between a first position wherein the flexible closure 92 substantially covers the opening 90 as shown (just for example) in FIG. 11D, a second position wherein the flexible closure 92 exposes the opening 90 as shown (just for example) in FIG.

11E, and intermediate positions therebetween. The flexible closure 92 is constructed and arranged to be positioned around (exterior to) the base wall 86 (outside the space 88), when the flexible closure 92 is in the second, open position. This is a result of the guide 84 being closer to the periphery of side wall 82 than is the base wall 86 (i.e., the guide 84 is generally at the periphery, while the base wall 86 is slightly spaced from the periphery). In one embodiment, the flexible closure 92 includes number of slats 91 that are arranged in parallel to one another and fixed to a flexible backing. The slats 91 may be made from plastic, wood or metal or any other material as would be appreciated by one skilled in the art, while the flexible backing is made from a material that is capable of being flexibly guided around the base wall 86. In another embodiment, flexible closure 92 is an integrally formed structure molded from plastic. Specifically, the slats 91 may be molded from a plastic material, and they can be connected to one another by integrally formed thin portions of the molded plastic structure that functions as living hinges 154 between the more rigid slats. In one embodiment, the slats 91 generally have a U-shaped cross-section as shown in FIG. 11F.

The flexible closure 92 includes a gripping tab 93 that allows the user to move the flexible closure 92 between the closed position and the open position along the track 84. The gripping tab 93 is located on an front edge of the flexible closure 92 that engages with the base wall 82 when the flexible closure 92 is in the closed position. When the storage compartment 80 is not in use, the flexible closure 92 is used to cover the opening 90 so as to prevent the dirt from getting into the storage compartment 80.

Figure 13:
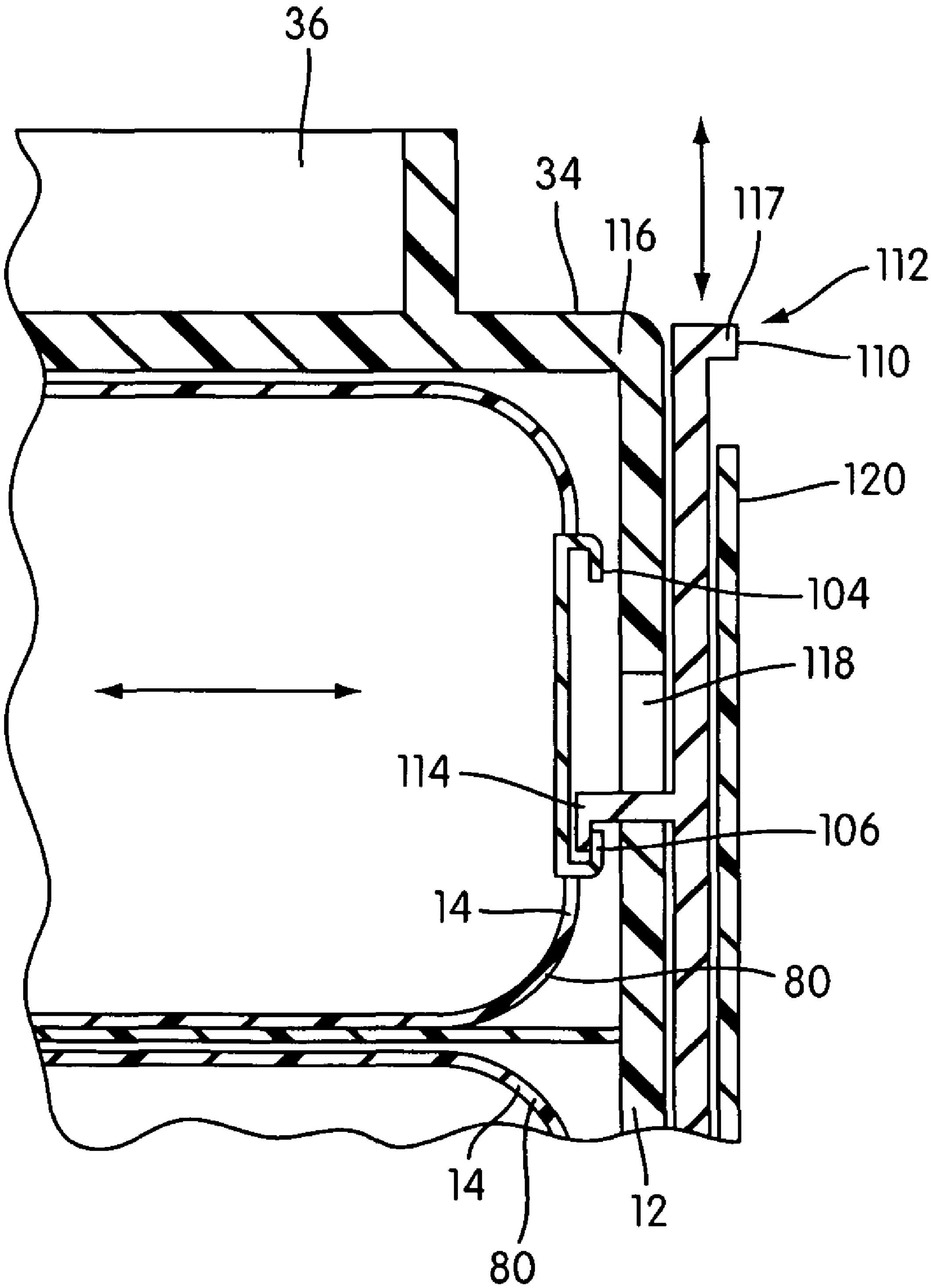
FIG. 13 is a cross sectional view of a compartment lock assembly in accordance with an embodiment of the present invention.

The storage compartment 80 includes a rear wall 102. As seen in FIGS. 11A, 11C, and 13, the rear wall 102 is attached to the side walls 82 of the storage compartment 80 at the rear portion of the storage compartment 80. In the embodiment, mating members 104 and 106 protrude from the rear wall 102 and define a generally C-shaped cross section configuration. As will be understood from the discussions later, the mating member 104 located on the top is configured to attach to a wall mount 122 (see FIGS. 17-19) for mounting the storage compartment 80 on a wall (not shown) and the mating member 106 located on the bottom is configured to attach with a compartment lock assembly 112 and to lock the storage compartment 80 in the container 12. In one embodiment, the storage compartment 80 has only the mating member 106 that is configured to attach with the compartment lock assembly 112 to lock the storage compartment 80 in the container 12, and the mating member is omitted. In another embodiment, only mating member 104 is provided, and mating member 106 is omitted. This may particularly be the case where storage compartment 80 is sold by itself, without container 12. In another embodiment, no mating members (neither 104 nor 106) are provided.

The handle 94 is connected to the triangular portion 304 of the side walls 82 to enable the storage compartment 80 to be transported. In one embodiment, the handle 94 has a generally cylindrical shape. The handle 94 is connected to the end of side walls 82 on a side of compartment 80 opposite from the rear wall 102. The handle 94 is mechanically connected to the side walls 82 by any of several well known attachment mechanisms such as welding, bolting or any other fastening mechanism as would be appreciated by one skilled in the art. In one embodiment, the handle 94 may be integrally formed with the side walls 82 of the storage compartment 80.

FIG. 11A shows the flexible closure 92 positioned in the first position wherein the flexible closure 92 substantially covering the opening 90, and FIG. 11B shows the flexible closure 90 positioned in an intermediate position, between the first position and the second position, wherein the flexible closure 92 partially exposes the opening 90. The flexible closure 90 can also be moved from the intermediate position to the second position wherein the flexible closure 92 completely exposes the opening 90.

Figure 11E:
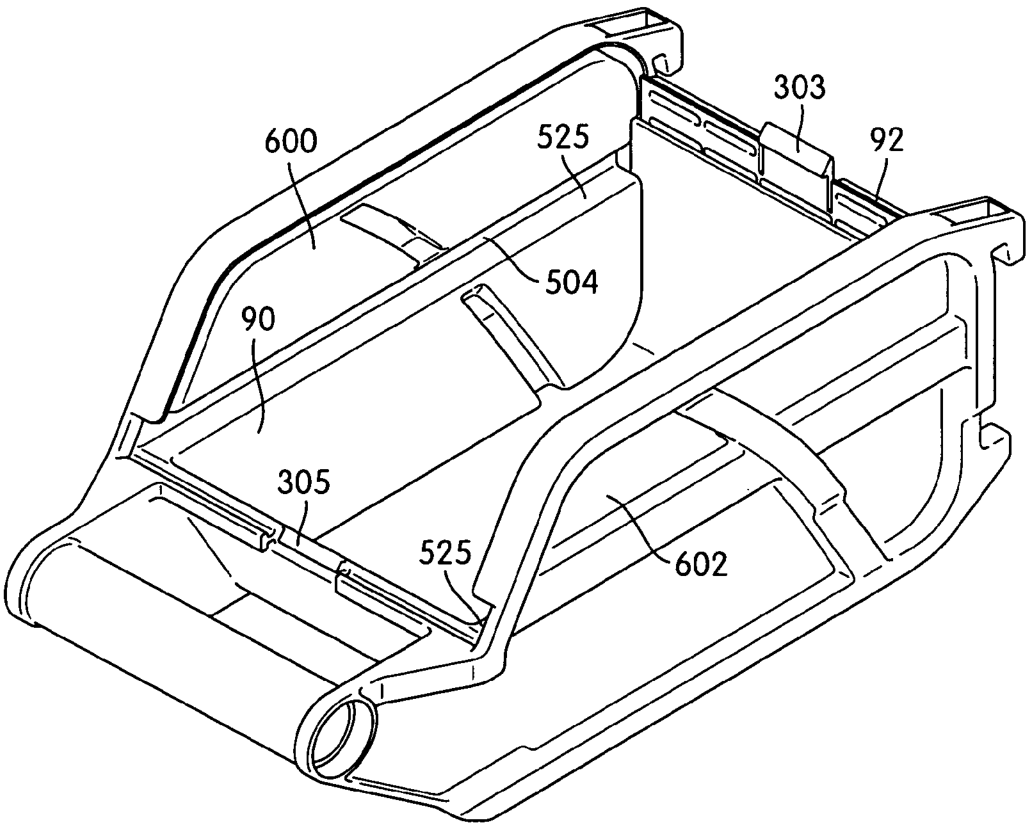
FIG. 11E is a perspective view of storage compartment of FIG. 11D in an open position.
Figure 11F:
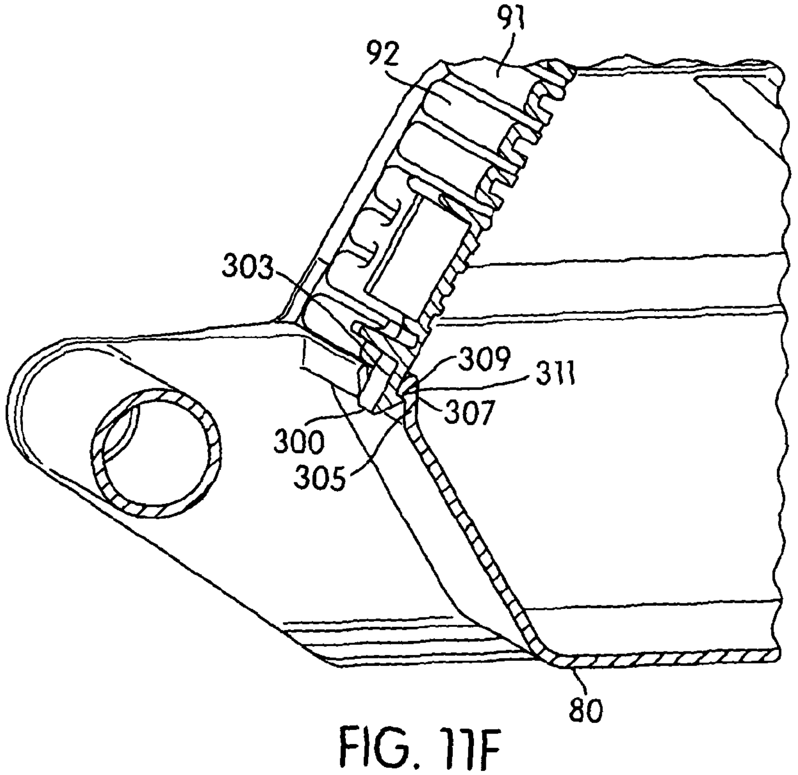
FIG. 11F is a detailed view of a latch of the flexible closure engaged with a snap of the storage compartment in accordance with an embodiment of the present invention.
Figure 11G:
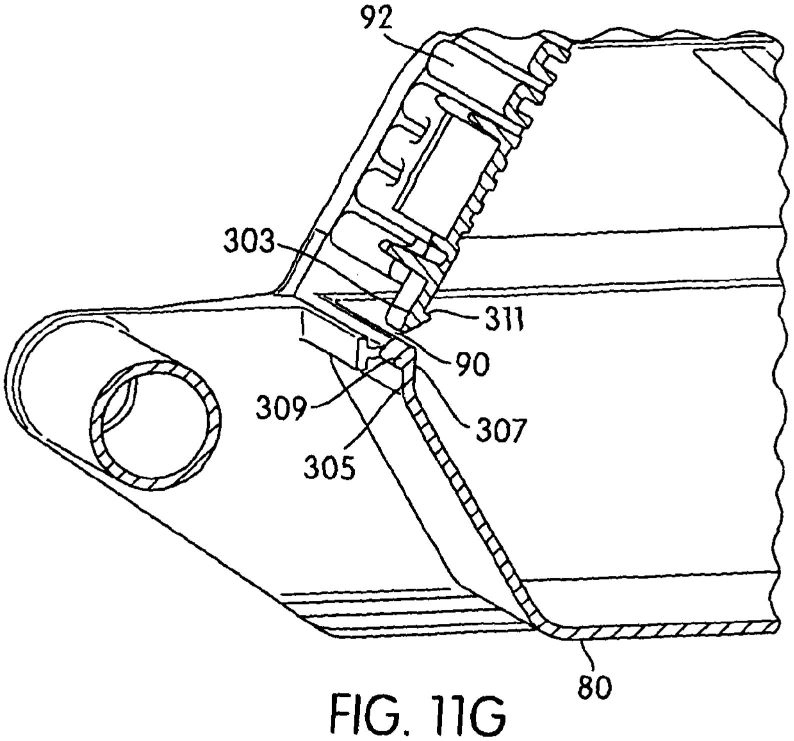
FIG. 11G is a detailed view of the latch of the flexible closure released from the snap of the storage compartment in accordance with an embodiment of the present invention.

In one embodiment, as shown in FIGS. 11D through 11G, when the flexible closure 92 is in the first position (closed position) substantially covering the opening 90, the latch and snap mechanism 300 is used to lock the flexible closure 92 with the storage compartment 80. The latch mechanism 300 prevents the flexible closure 92 of the storage compartment 80 from opening when being transported from one place to another. The latch mechanism 300 includes a latch 303 attached to the flexible closure 92 and a snap 305 attached to the storage compartment 80, although in another embodiment the latch 303 can be placed on the storage compartment 80 and the snap placed on the flexible closure 92. The latch 303 of the flexible closure 92 engages with the snap 305 of the storage compartment to lock the flexible closure 92 with the storage compartment 80 in the closed position. In one embodiment, the snap 305 includes a cantilever beam 307 with a protrusion 309 that deflects so that the protrusion 309 engages with or snaps into a groove or a recess 311 in the latch 303 of the flexible closure 92. FIG. 11G shows the latch 303 being released from the snap 305 to enable movement of the flexible closure 92 from the closed position to the open position, so that the flexible closure 92 exposes the opening 90. When releasing the snap 305 from the latch 303, the cantilever beam 307 with the protrusion 309 deflects away from the groove or the recess 311 in the latch 303, thereby disengaging the protrusion 309 from the groove or the recess 311. FIG. 11E shows the flexible closure 92 moved to the second position exposing the opening 90. It should be appreciated that the latch and the snap mechanism 300, as shown in the illustrated embodiment, is but one example of the different types of locking mechanisms with different engagement shapes, configurations and/or constructions that can be provided.

Figure 12:
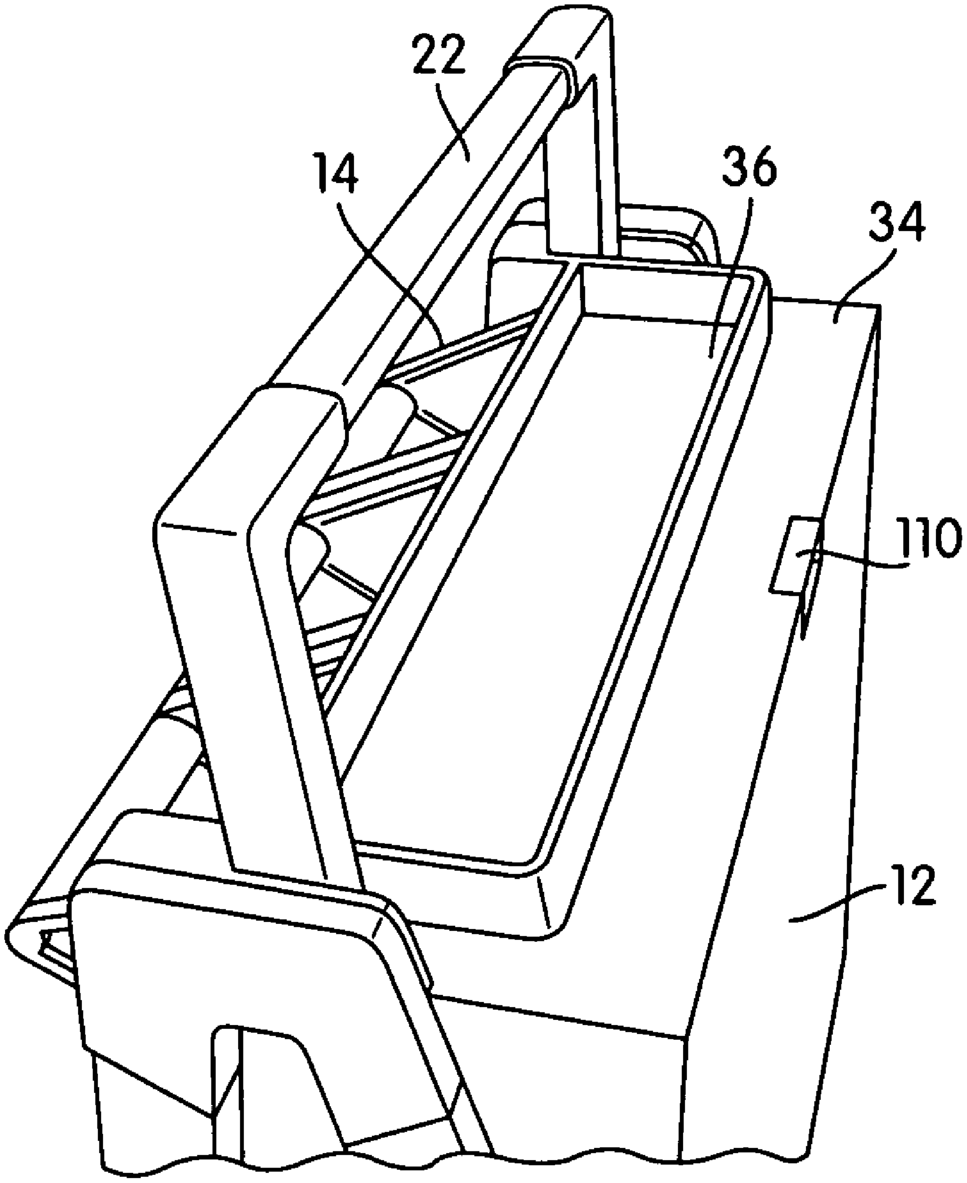
FIG. 12 is a perspective view of a manually movable member of the compartment lock assembly and a sorting tray in accordance with an embodiment of the present invention.

FIG. 12 shows a manually movable member 110 of the compartment lock assembly 112 that is constructed and arranged to unlock the plurality of compartments 14 carried by the container 12 in a single operation.

FIG. 13 shows a partial cross-sectional view of the compartment 80 and lock assembly 112. The compartment lock assembly 112 comprises the manually movable member 110 that is movable between an initial position and a final position. The movement of the first manually movable member 110 from the initial position to the final position unlocks the compartment lock assembly 112 to release and to enable the plurality of compartments 14 to be entirely pulled out from the container 12.

In one embodiment, as shown in FIG. 13, the manually movable member 110 is positioned so as to extend within a space between a rear wall 116 of the container 12 and a rearward backing member 120. The backing member 120 is attached to the rear wall 116 of the container 12 along the periphery of the rear wall 116. The manually movable member 110 has a tab 117 at a top portion thereof that facilitates manual grasping or engagement of the manually movable member 110. The manually movable member 110 includes at least one protrusion or hook member 114 that is integrally formed on the manually movable member 110. In an embodiment, the at least one protrusion member 114 has a generally L-shaped configuration. The at least one protrusion member 114 is configured to removeably engage with the mating member 106 of the storage compartment 80 when the protrusion 114 is in a lower or first position thereof. In one embodiment, a plurality of protruding members 114 may be spaced apart at regular intervals in longitudinal and transverse directions on the manually movable member 110 such that each protruding member 114 engages with at least one corresponding mating member 106 of the storage compartment 80, such that each of the individual storage compartments 80 can all be locked by positioning the manually movable member 110 disposed in the lower position. The rear wall 116 of the container 12 includes at least one hole 118 that allows the protruding member 114 of the manually movable member 110 to pass through manually movable member 110

The manually movable member 110 can be moved from an initial locking position to an unlocking position by upwardly pulling the tab 117 of the manually movable member 110. The movement of the manually movable member 110 from the lower position and the upper position lifts the protrusions 114 upwardly such that the protrusions 114 disengage with the associated mating members 106 of the storage compartments 80. The disengagement of the protruding members 114 manually movable member 110 with the mating members 106 of the storage compartments 80 releases and enables the storage compartments 80 to be pulled out of the container 12 with one releasing movement of the manually movable member 110.

The manually movable member 110 may moved back to the locking position by pushing the tab 117 of the manually movable member 110 downwardly so as to lock the plurality of compartments 14 carried by the container 12 in a single operation. When the manually movable member 110 is moved into the initial, locking position, the protruding member 114 moves downwardly to engage with the mating member 106 of the storage compartment 80. The engagement of the protruding member 114 of the manually movable member 110 with the mating member 106 of the storage compartment 80 locks the storage compartment 80 in the container 12. In one embodiment, the tab 117 (and entire manually movable member 110) is spring biased downwardly so as to be retained in the locking position until it is manually moved against the spring bias thereof to the upper, unlocked position.

In another embodiment, the drawer 74 may have a mating member located on the rear wall of the drawer 74, that engages with a protruding member 114 on the manually movable member 110 to lock the drawer 74 in the container 12. In one embodiment, the manually movable member 110 enables the compartment lock assembly 112 to lock both types of compartments 14 (drawer 74 and the storage compartments 80) simultaneously in a single operation.

Figure 14B:
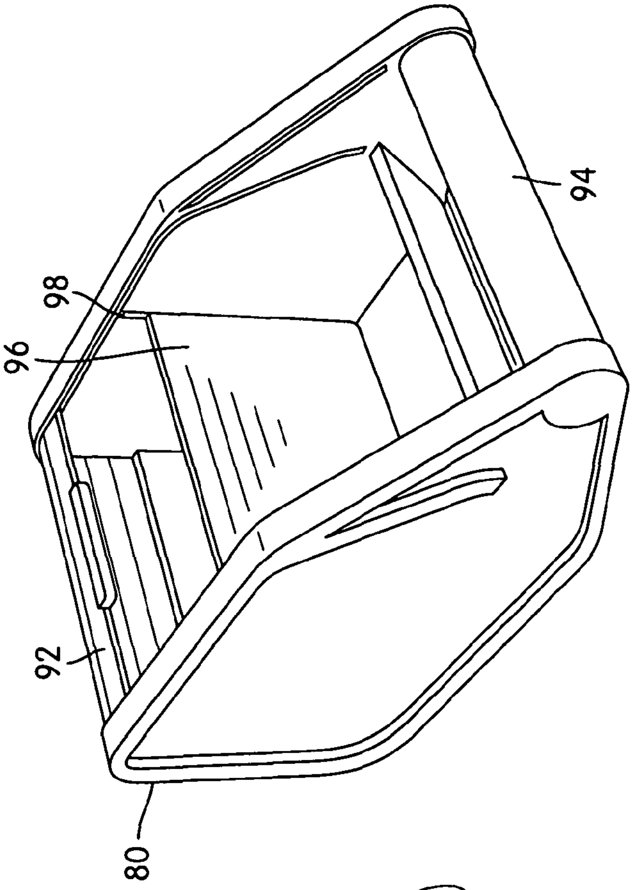
FIG. 14B is a perspective view of a storage compartment with removable dividing walls after the assembly in accordance with an embodiment of the present invention.
Figure 14A:
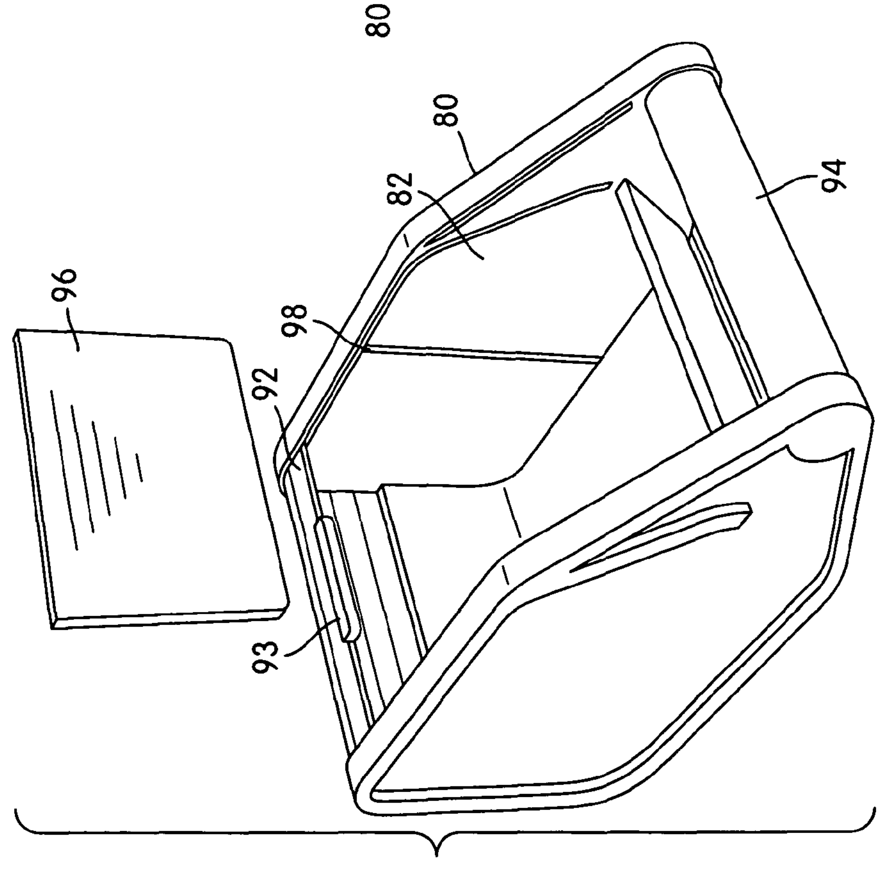
FIG. 14A is a perspective view of a storage compartment with removable dividing walls before the assembly in accordance with an embodiment of the present invention.

FIGS. 14A and 14B show the storage compartment 80 with a removable dividing wall 96 before and after the installation of the wall. The storage compartment 80 can be divided into at least two sections by at least one removable dividing wall 96. A plurality of integral grooves 98 located on the side walls 82 are constructed and arranged to receive the opposite side edges of the removable dividing wall 96. Alternatively, in another embodiment, the grooves 98 may be provided on a separate structure and configured to be removeably attached with respect to the side walls of the storage compartment 80. The removable dividing walls 96 may be provided in different geometries to provide different numbers of sections and different configurations. The removable dividing walls 96 may be made from a molded plastic material or any other material such as wood, metal, etc., as would be appreciated by one skilled in the art.

Figure 15B:
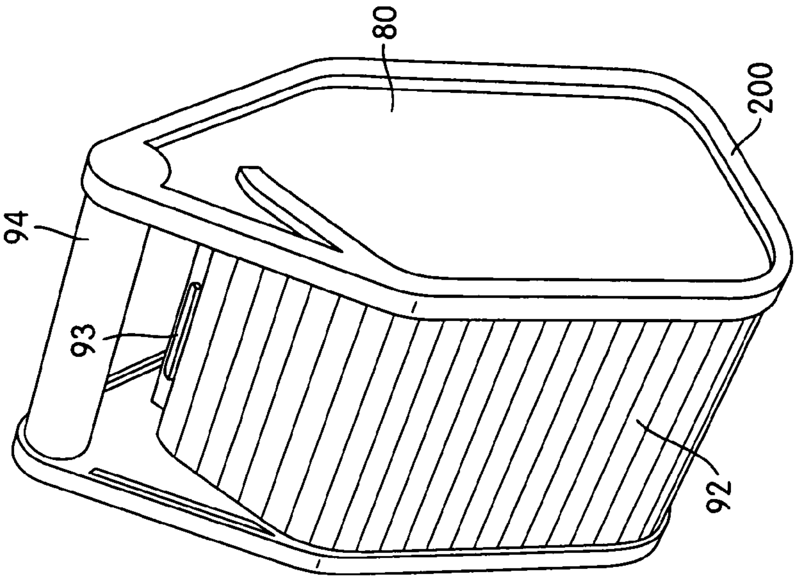
FIG. 15B is a perspective view of a storage compartment placed vertically with flexible closure in a closed position in accordance with an embodiment of the present invention.
Figure 15A:
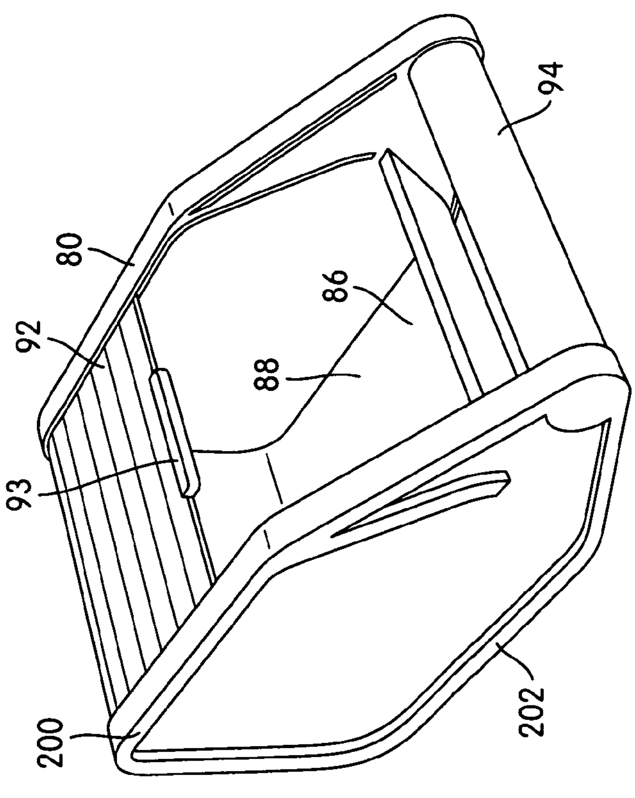
FIG. 15A is a perspective view of a storage compartment placed horizontally with flexible closure in an open position in accordance with an embodiment of the present invention.

In one embodiment, storage compartment 80 can optionally be used as an independent, portable storage compartment. The storage compartment 80 can be removed completely from the container assembly 10 to be transported from one place to another. When transported from one place to another, the storage compartment 80 is in a vertical position, with the carrying handle 94 on top. When transported from one place to another, the flexible closure 92 is locked to prevent loss of articles stored in the space 88. Upon reaching the destination, the storage compartment 80 can be placed in horizontal position thereby allowing the user to access the articles stored in the space therewithin. FIGS. 15A and 15B show the storage compartment 80 in a horizontal position and in a vertical position respectively. As shown in FIG. 15A, a lower portion 202 of the protruding member 200 of the storage compartment 80 serves as a base on which the storage compartment 80 rests when placed in the horizontal position. When placed in the vertical position, the flat surfaces 160 on the mating members 104 and 106 (as shown in FIG. 11C) of the storage compartment 80 serve as a base on which the storage compartment 80 rests.

Figure 16A:
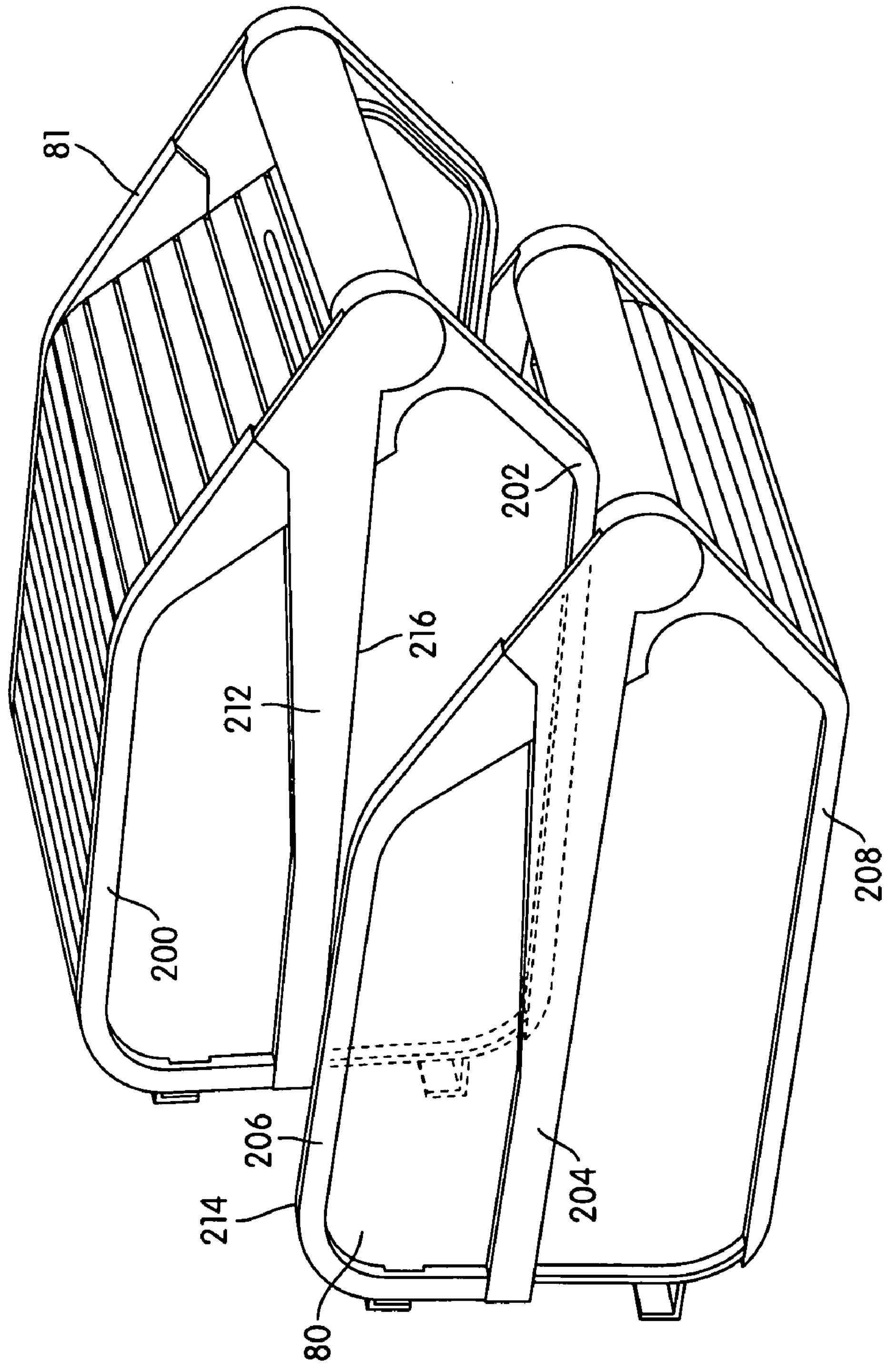
FIG. 16A is a perspective view of a storage compartment being slid into a nesting relationship with an identical storage compartment in accordance with an embodiment of the present invention.

FIG. 16A shows an identical storage compartment 81 sliding into the storage compartment 80. The flexible closure 92 of the storage compartment 80 is placed in the open position to expose the opening 90 and to allow the identical storage compartment 81 to slide into the storage compartment 80. The lower portion 202 of the protruding member 200 of the identical storage compartment 81 is constructed and arranged to slide within a guide 204 located in the middle portion of the storage compartment 80. An upper portion 206 of a protruding member 208 of the storage compartment 80 is constructed and arranged to engage with a guide 212 located in the middle portion of the identical storage compartment 81. In one embodiment, an outer, upper wall 214 of the upper portion 206 of the protruding member 208 engages with an outer, lower wall 216 of the guide 212. The protruding members and the guides located on the storage compartment 80 and the identical storage compartment 81 to assist in sliding the identical storage compartment 81 into the identical storage compartment 80.

Figure 16B:
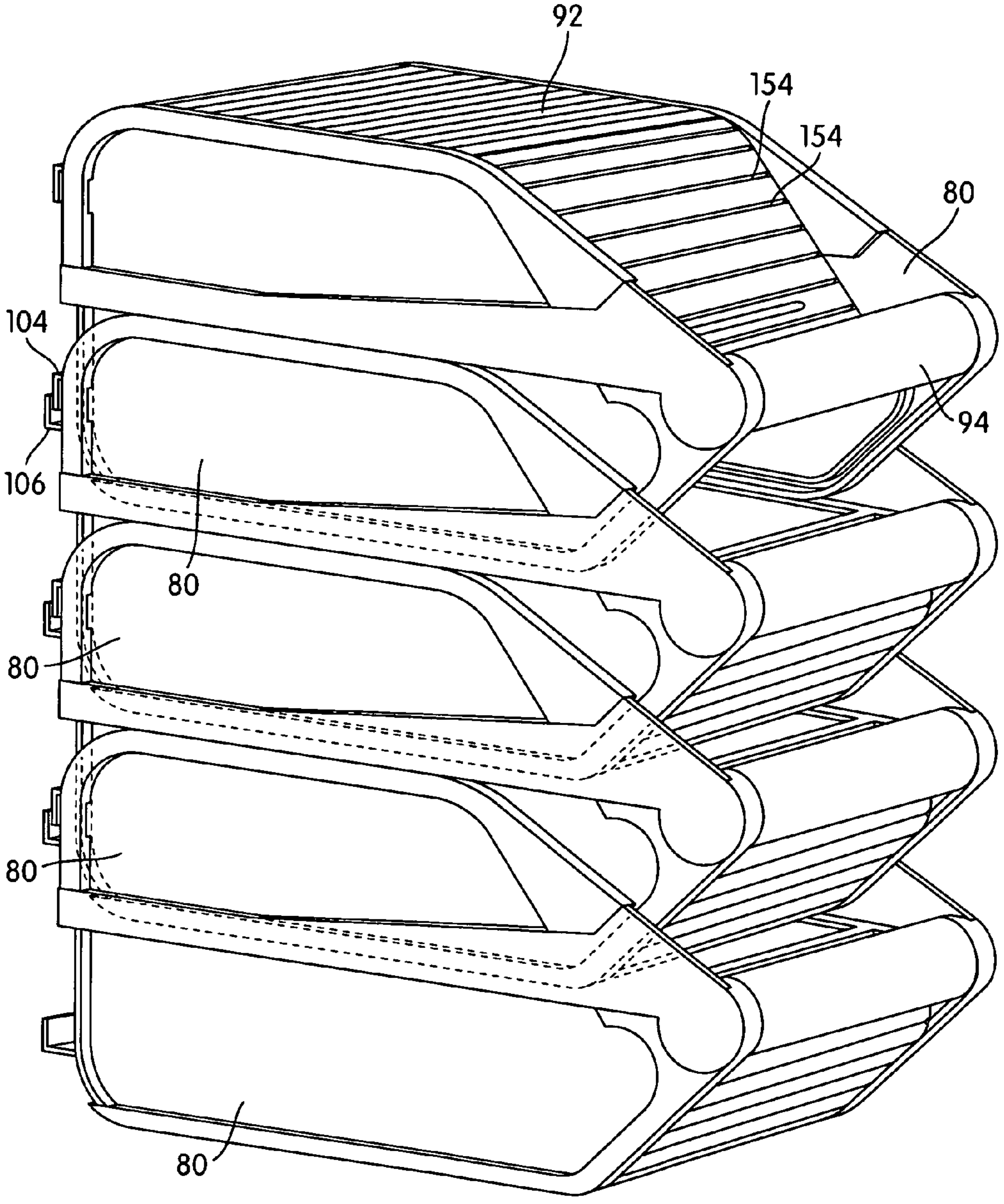
FIG. 16B is a perspective view of a plurality of storage compartments in a stacked, nesting position in accordance with an embodiment of the present invention.
Figure 16C:
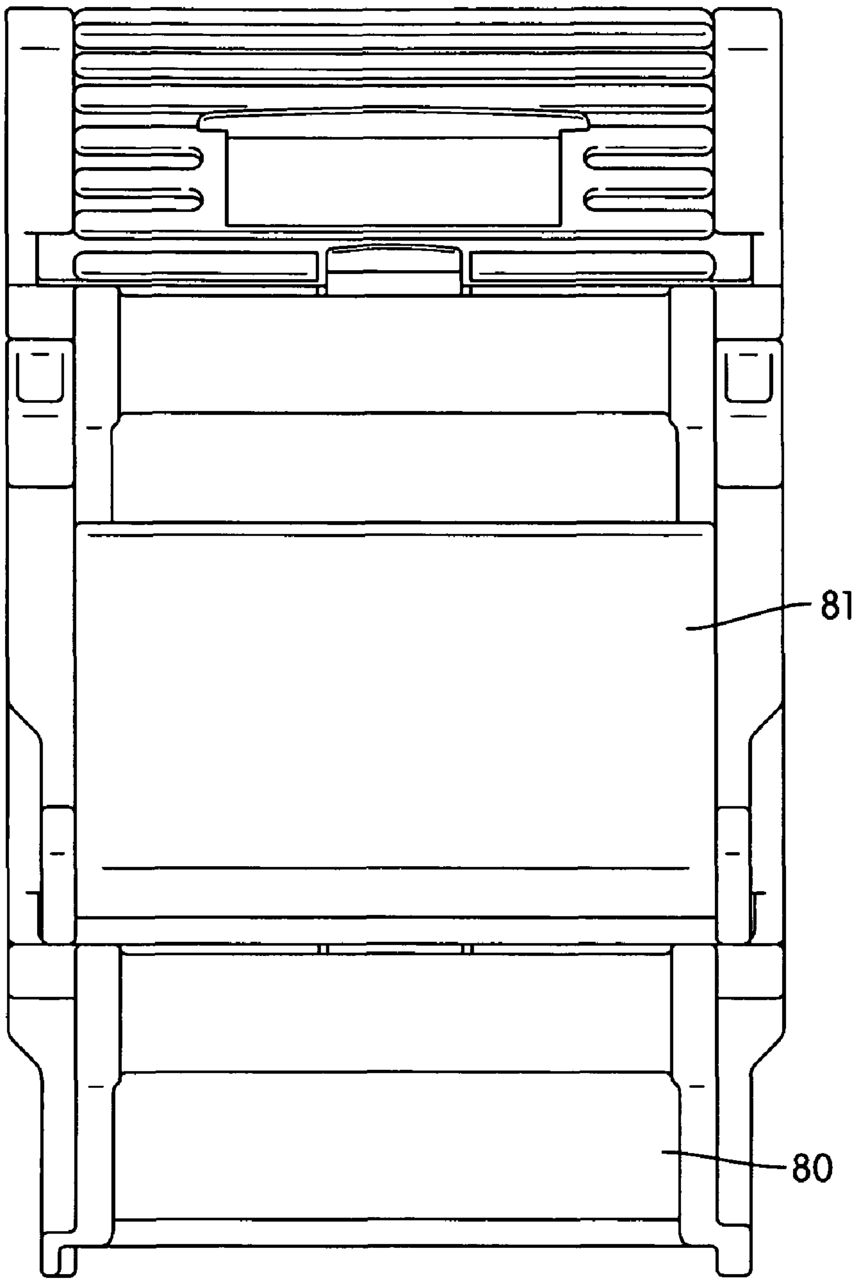
Figure 16D:
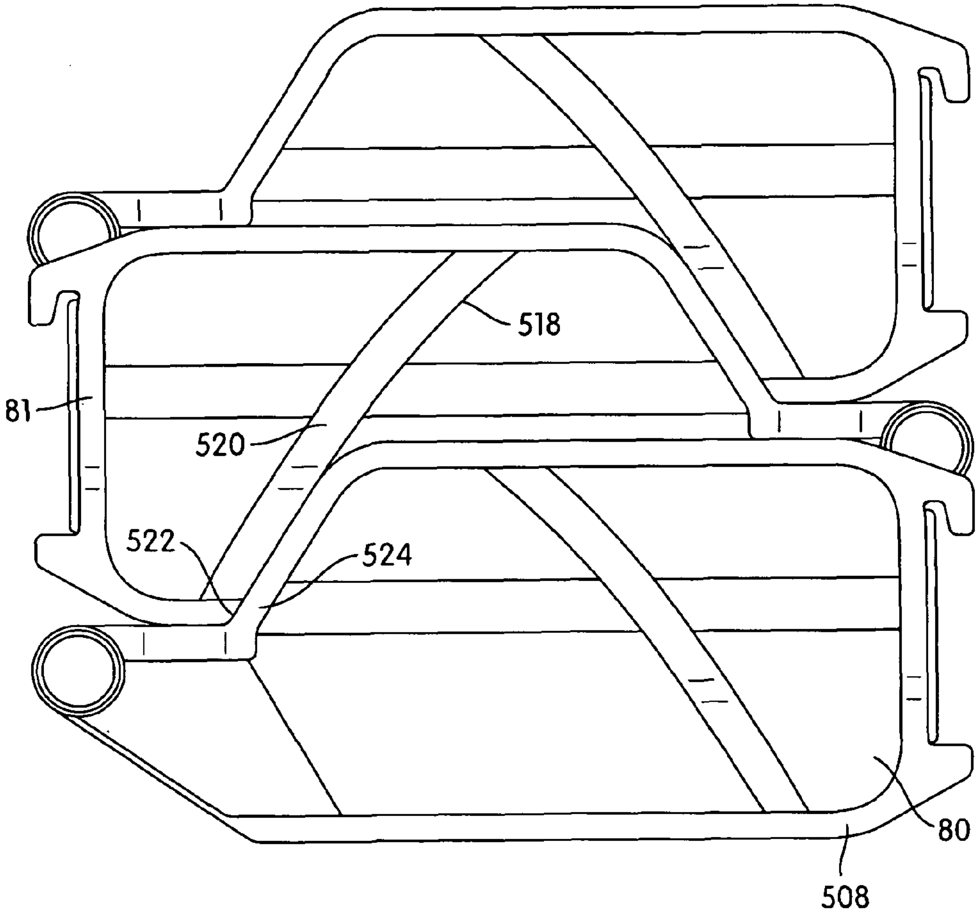
Figure 16E:
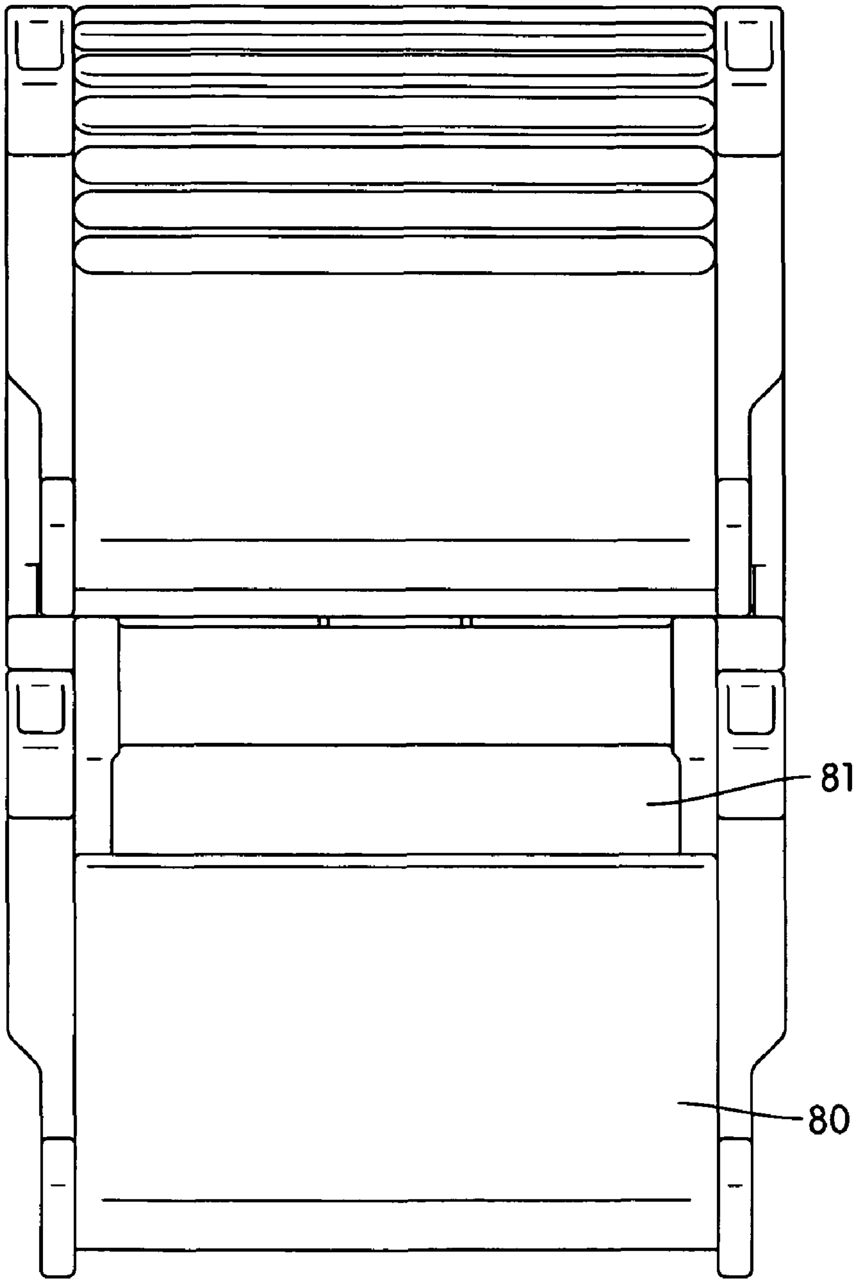
Figure 16F:
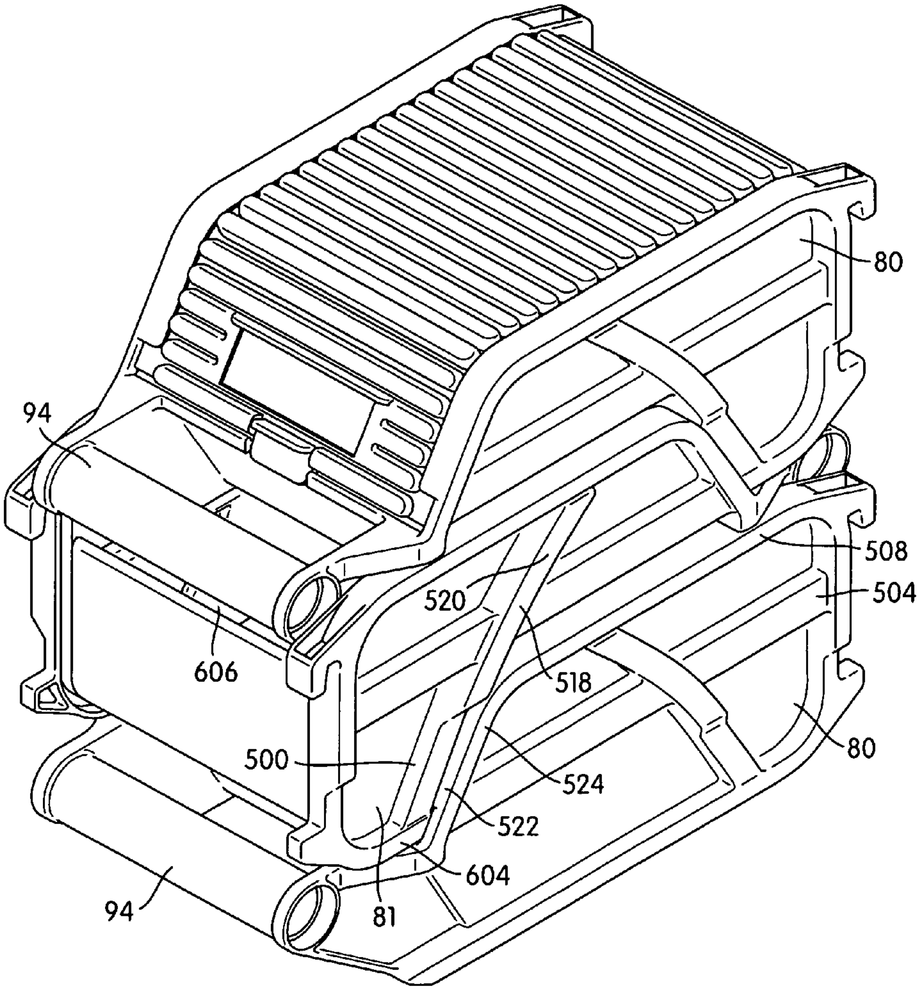

FIG. 16B shows nesting of plurality of identical storage compartments. In order to nest plurality of identical storage compartments, each storage compartment is slid into another storage compartment as discussed above. The nesting of plurality of identical storage compartments provides for compact shipping and storage of the storage compartments 80.

FIGS. 16C-F show an alternate embodiment, in which a plurality of identical storage compartments are stacked in a nesting relationship, but facing opposite alternating directions. In this embodiment, alternating direction of a storage compartment 81 with respect to an identical storage compartment 80 reduces the space required to package and ship the nested storage compartments.

As described in the previous embodiment, the flexible closure 92 of the storage compartment 80 is placed in the open position to expose the opening 90 and to allow the identical storage compartment 81 to slide into the storage compartment 80. However, in contrast with the previous embodiment, the identical storage compartment 81 is placed in a reverse position with respect to the storage compartment 80 when sliding into storage compartment 80.

A pair of internal flanges 525 and a pair of guides 504, as shown in FIG. 11E, are located on opposite walls 600 and 602 of the storage compartment 80, only one such flange 525 and guide 504 are fully visible in FIG. 11E. Referring back to FIG. 16F, the bottom surface 604 of identical storage compartment 81 rests on the internal flange 525 (shown in FIG. 11E) of the storage compartment 80 as the identical storage compartment 81 slides into the storage compartment 80. The protruding member 500 of the identical storage compartment 81 is constructed and arranged to slide within a guide or groove 504 (shown in FIG. 11E) of the storage compartment 80. The handle 94 of the storage compartment 80 may be at least partially received in opening 606 of the underlying identical storage compartment 81 to provide a compact storage configuration of the nested storage compartments. In one embodiment, side wall 518 of a vertical, slanting member 520 of the identical storage compartment 81 is constructed and arranged to engage with an outer side wall 522 of a side portion 524 of a protruding member 508 of the storage compartment 80. The vertical, slanting member 520 prevents the identical storage members 81 from sliding beyond a limit into the storage compartment 80.

FIGS. 16C-F show plurality of identical storage compartments in a nested configuration. In order to nest plurality of identical storage compartments, each storage compartment is placed in a reverse direction slid into another storage compartment as discussed above.

Figure 17:
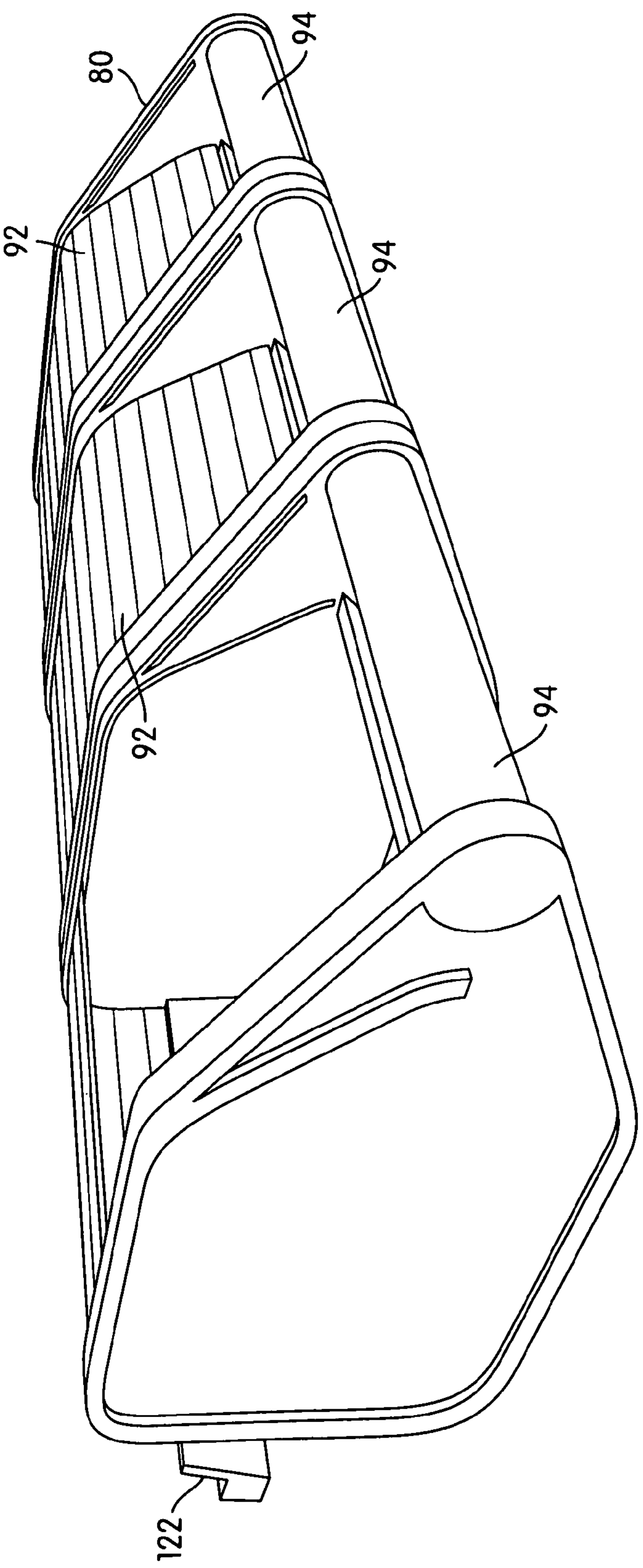
FIG. 17 is a perspective view of the storage compartment and a wall mount in accordance with an embodiment of the present invention.
Figure 19:
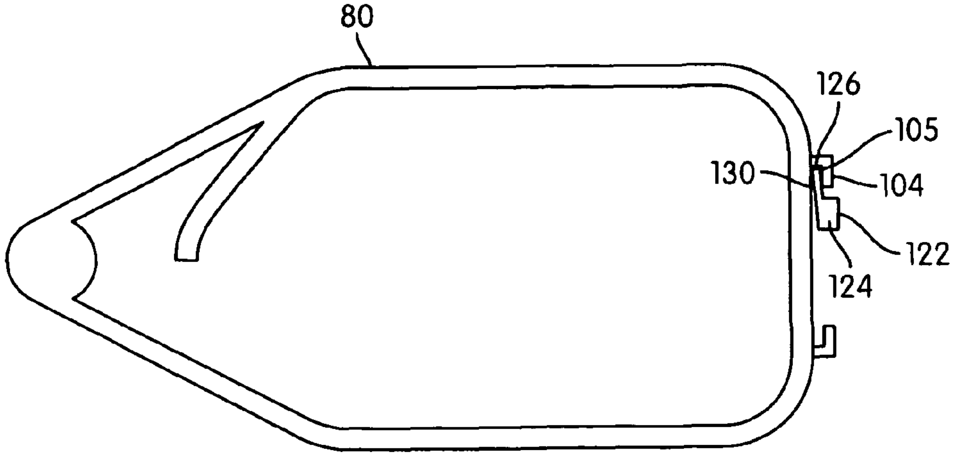
FIG. 19 is a side view of the storage compartment and the wall mount in accordance with an embodiment of the present invention.

In one embodiment, as shown in FIGS. 17 and 19, the storage compartments 80 are configured to be hung on a wall (not shown) using the wall mount 122. The mating member 104 of the storage compartment 80 is configured to engage or attach with the wall mount 122 for mounting the storage compartment 80 on the wall.

Figure 18:
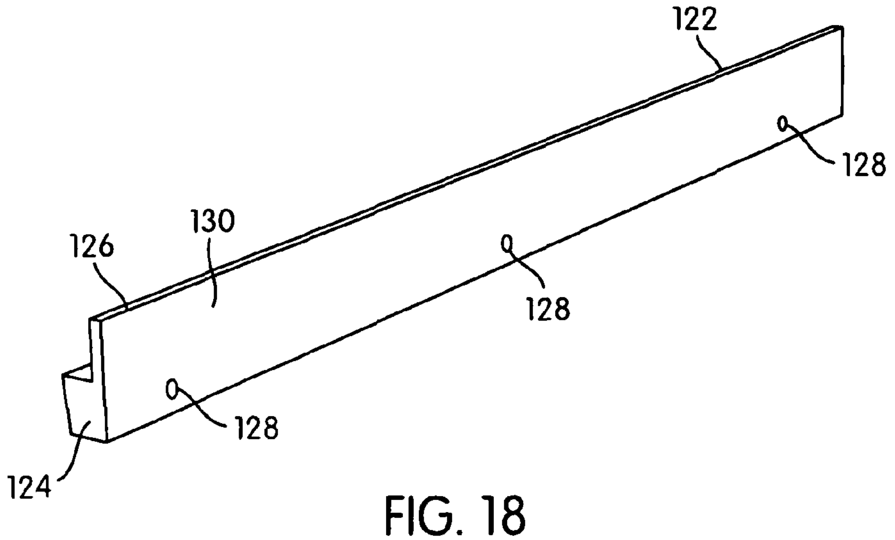
FIG. 18 is a perspective view of the wall mount in accordance with an embodiment of the present invention.

The wall mount 122 used to mount the storage compartment 80 on the wall is shown in FIG. 18. In one embodiment, the length of the wall mount 122 can be extended to any length so that a plurality of storage compartments 80 can be mounted on the same single wall mount 122. The wall mount 122 includes a bottom section 124 and a top section 126. The bottom section 124 is configured to engage with the wall and the top section 126 is configured to engage with the mating member 104 of the storage compartment 80. The bottom section 124 includes an elongated rectangular shaped structure having plurality of spaced apart, fastener or screw receiving openings 128. The screw receiving openings 128 are configured to receive screws (not shown) or any other fastener as would be appreciated by one skilled in the art to mount the wall mount 122 on the wall. The top section 126 includes protrusion or wall structure 130 that has a top portion that is sized to be received in a downwardly facing recess 105 defined by the mating member 104. The wall structure or protrusion 130 has a thickness that closely conforms to the dimensions of the recess 105 (they are approximately the same, or the protrusion 130 is just slightly thinner) so that when the recess 105 is moved downwardly onto the wall 130, the form fitting engagement therebetween retains the compartment 80 in a substantially horizontal orientation, as shown in FIG. 19.

FIGS. 20-22C show an alternate embodiment, but where similar components may be given the same reference numerals as one or more prior embodiments.

Figure 20:
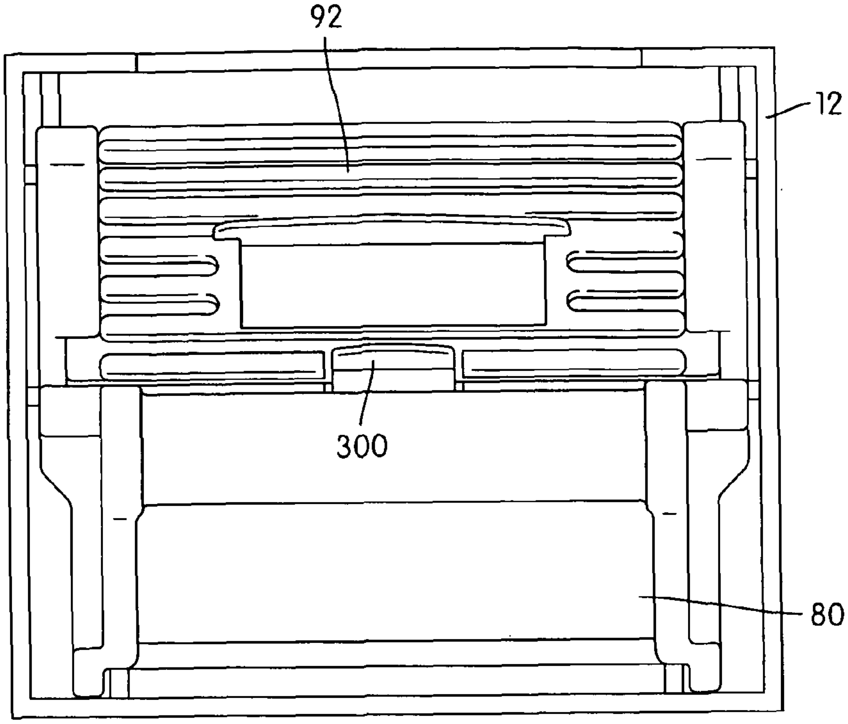

FIG. 20 shows the storage compartment 80 placed in the container 12, where the flexible closure 92 is in the closed position and the flexible closure 92 is locked using a lock mechanism 300.

Figure 21:
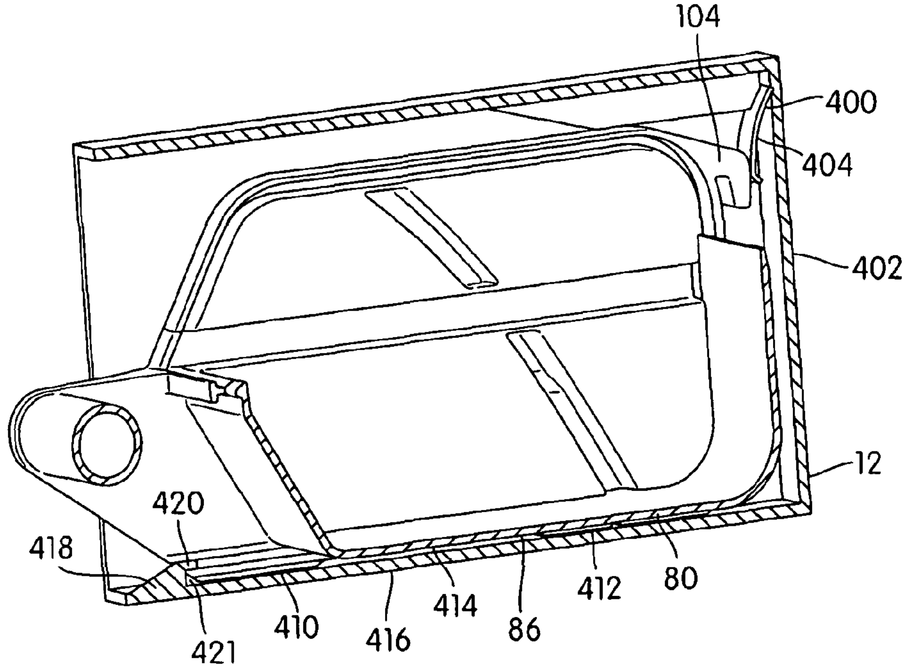

FIG. 21 shows a spring 400 attached to the upper portion of the rear wall 402 of the container 12. The spring 400 is constructed and arranged to bias the storage compartment 80 out of the container 12. In one embodiment, the spring 400 is a resilient member 404 in the form of a leaf spring extending from the rear wall 402 of the container 12 toward the mating member 104 of the storage compartment 80. The spring 400 may be a thin metallic structure attached at its rear end to the plastic compartments 80, or in another embodiment may be an integrally formed plastic spring portion. In another embodiment a metal coil spring can be used or any other spring as known in the art. The mating member 104 of the storage compartment 80 has a surface 406 against which the resilient member 404 rests. The resilient member 404 bends (is flexed) when the storage compartment 80 is pushed into the container 12.

As shown in FIGS. 21 and 22A-22C, the base wall 86 of the storage compartment 80 includes a front leg or tab 410 and a rear leg or tab 412 that are separated from each other by a recess 414. A bottom wall 416 of the container 12 includes a lock member 418. In one embodiment, the bottom wall 416 of the container 12 is in the form of smooth shelf for receiving the storage compartments 80. The lock member 418 serves as to lock compartment 80 in container 12 and also serves to prevent the storage compartment 80 from falling out of the container when pulled outwardly therefrom. In one embodiment, the lock member 418 has a generally L-shaped portion 420 defining a recess 421 that engages and receives the front tab 410 and/or the rear tab 412. As shown in FIG. 21, the lock member 418 of the container 12 engages with the front tab 410 to secure the storage compartment 80 within in the container 12, and the spring 400 biases the compartment 80 forwardly so that the front tab 410 is forced into the recess 421 to lock the compartment in place.

Figure 22A:
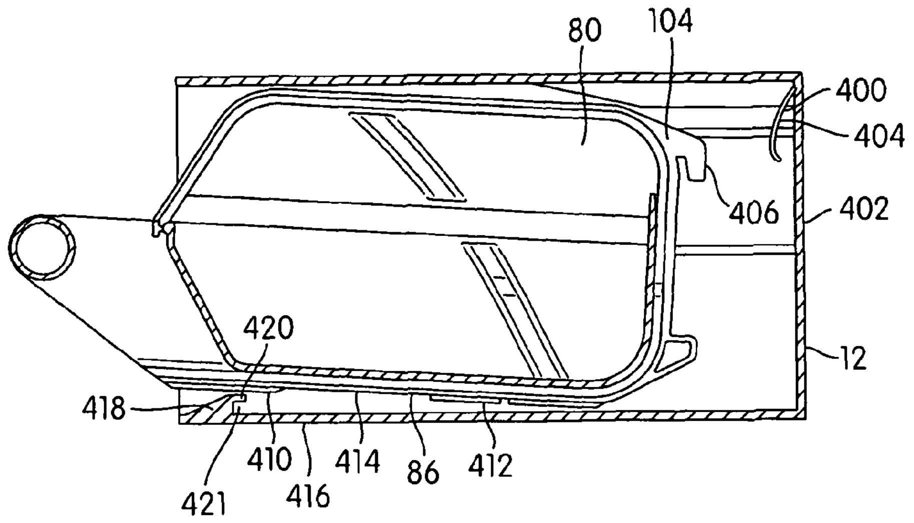
FIG. 22A is a side view of the storage compartment being taken out of the container using a spring in accordance with the alternate embodiment.
Figure 22B:
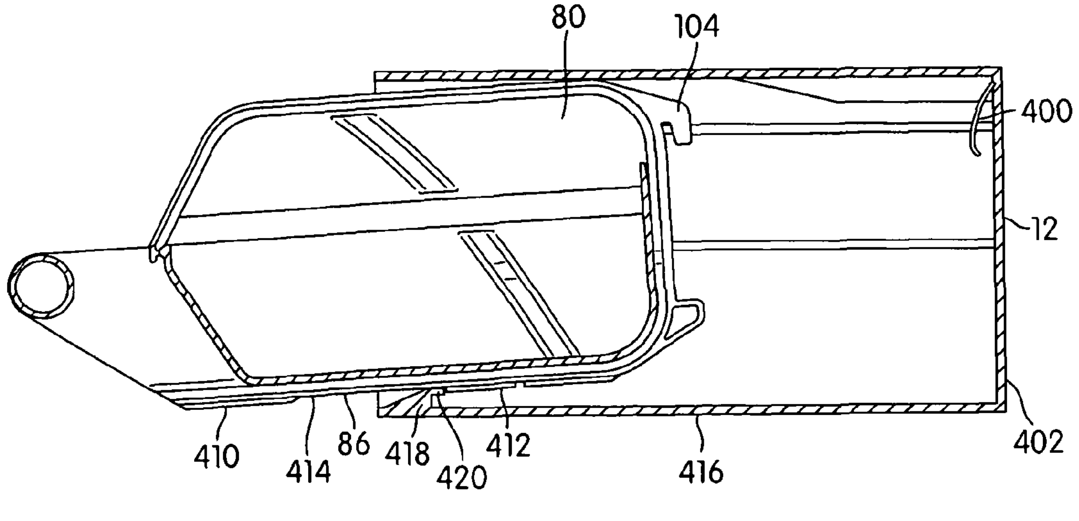
FIG. 22B is a side view of the storage compartment moved into a working position when place within the container in accordance with the alternate embodiment.
Figure 22C:
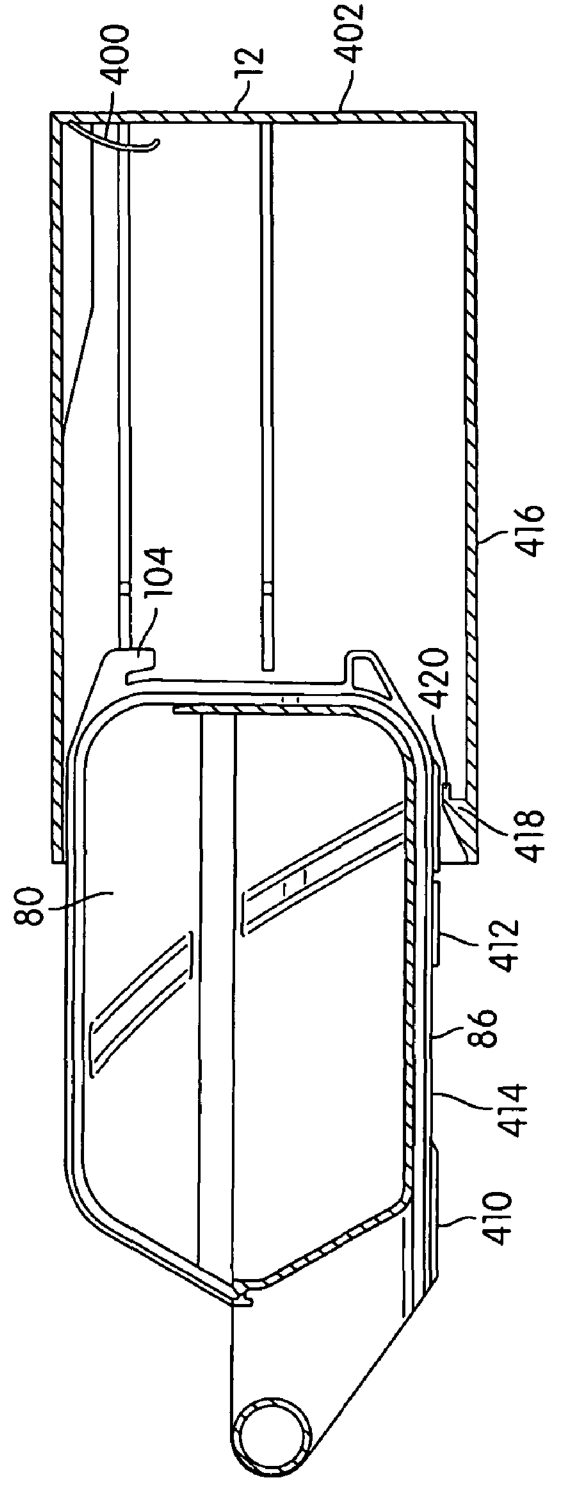
FIG. 22C is a side view of the storage compartment in accordance with the alternate embodiment.

FIGS. 22A-22C show the operation to remove the storage compartment 80 from the container 12. The storage compartment 80 is pushed towards the rear wall 402 of the container 12 against the bias of spring 400 so that front tab 410 can be moved out of recess 421. FIG. 22A shows a position of the storage compartment 80 after the front tab 410 is released from the lock member 418. After releasing the front tab 410 from the recess 421, the front portion of the storage compartment 80 is tilted upwards slightly so that the front tab 410 passes over the L-shaped member 420. Then the storage compartment 80 is forced at least partially outwardly by spring 400 and can be placed in the horizontal position. The storage compartment 80 can be pulled outwardly to a work position or intermediate position as shown in FIG. 22B. As the storage compartment 80 is moved from within the container 12 to a work position or an intermediate position, the lock member 418 moves along the surface 414 and engages with the second tab 412, thus securing the storage compartment 80 in this intermediate position. In one embodiment (as shown), the tab 412 is merely a thick material portion that engages the front lip of lock member 418, although in another embodiment it may comprise a thin flange that can be received in recess 421. The intermediate position or the work position, as shown in FIG. 22B, provides the user to access the articles stored in the storage compartment 80.

In order to remove the storage compartment 80 completely from the container 12, the storage compartment 80 is slightly tilted and lifted upwards to disengage the rear tab 412 from the lock 418, thus, allowing the rear tab 412 to pass over the L-shaped member 420. Once the rear prop 412 is disengaged from the L-shaped member 420, the storage compartment 80 is placed in horizontal position and can be pulled out of the container 12. Therefore, the storage compartment 80 is to be placed in a horizontal position when pulling the storage compartment 80 out of the container 12, if not, the lock 418 will prevent the removal of the storage compartment 80.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A container assembly, comprising:

a container;

at least one compartment constructed and arranged to be carried by the container, the at least one compartment being configurable between an open configuration and a closed configuration;

a plurality of extendable legs operatively connected with the container, the legs supporting the container at a selected height; and a lock assembly that locks the legs and hence the container at the selected height, the lock assembly including a manually engageable member that is movable between a first position and a second position, wherein the manually engageable member is linked to lock components associated with at least two of the legs so that the movement of the manually engageable member from the first position to the second position unlocks the lock assembly to enable longitudinal movement of the at least two of the legs to facilitate height adjustment of the container.

2. The container assembly of claim 1, wherein the lock assembly is spring biased into a locked position to prevent longitudinal movement of the legs.

3. The container assembly of claim 2, wherein the lock assembly includes a single manually engageable member that is movable against the spring bias so as to release a pair of pins, each associated with one of the legs, so as to release the legs from being locked.

4. The container assembly of claim 1, wherein the lock assembly comprises pins constructed and arranged to be received in holes within the legs to facilitate height adjustment of the container.

5. The container assembly of claim 1, wherein the legs extend at an outwardly diverging angular direction with respect to each other, as they extend downwardly.

6. The container assembly of claim 5, wherein the angularly diverging legs are configured to define an increasingly larger footprint as the legs are extended.

7. The container assembly of claim 6, wherein the legs comprise a roller member to rollingly support the container assembly.

8. The container assembly of claim 7, wherein the roller member is a wheel.

9. The container assembly of claim 7, wherein the roller members are constructed and arranged to facilitate movement of the angularly diverging legs towards and away from each other during height adjustment of the container.

10. The container assembly of claim 1, wherein the container comprises a plurality of compartments that can be pulled outwardly from the container.

11. The container assembly of claim 10, further comprising a compartment lock assembly constructed and arranged to prevent the plurality of compartments from being pulled outwardly from the container.

12. The container assembly of claim 11, wherein the compartment lock assembly comprises a manually movable member that is movable between a lock position and a release position, wherein movement of the manually movable member from the lock position to the release position unlocks the compartment lock assembly to enable the plurality of compartments to be pulled outwardly from the container.

13. The container assembly of claim 12, wherein the manually movable member comprises protruding members configured to removably engage with mating members of the compartments.

14. The container assembly of claim 1, wherein the at least one of the compartment comprises a drawer, wherein the drawer can be pulled outwardly to provide the open configuration and pushed closed to provide the closed configuration.

15. The container assembly of claim 14, wherein the drawer contains at least one bin with a slidable flexible closure, wherein the closure can be moved between open and closed positions to provide the open and the closed configurations.

16. The container assembly of claim 1, wherein the at least one compartment is configured to be partially pulled out from the container or fully removed from the container.

17. The container assembly of claim 1, wherein the at least one compartment has a flexible closure that can be moved between an open position and a closed position to permit and prevent access to a space within the compartment.

18. The container assembly of claim 17, wherein the flexible closure capable of being moved between the open position and the closed position while the compartment is retained inside the container.

19. The container assembly of claim 1, wherein the container comprises guide for receiving the compartments.

20. The container assembly of claim 1, wherein the compartment comprises a pair of side walls disposed generally parallel to one another and providing a track;

a base wall extending between the side walls, and extending generally adjacent to the periphery of the side walls along a portion of the periphery of the side walls, the base wall and the side walls cooperating to define, at least in part, a space within the compartment, the compartment having an opening to access the space;

a flexible closure slidably mounted on the track and movable along the track between a first position wherein it substantially covers the opening and a second position wherein it exposes the opening; and a carrying handle connected to at least one of the walls to facilitate removal of the compartment from the container and to enable the storage compartment to be transported.

21. The container assembly of claim 1, further comprising a handle connected to the container.

22. The container assembly of claim 1, wherein the at least one compartment and the container comprise a cooperative releasable lock assembly constructed and arranged to releasably lock the compartment within the container.

23. The container assembly according to claim 22, wherein the releasable lock assembly comprises a spring that biases the at least one compartment outwardly from the container when the lock assembly is released.

24. The container assembly according to claim 23, wherein the lock assembly comprises interengaging surfaces provided on the container and the at least one compartment, and wherein the spring retains the interengaging surfaces in interengaging relationship until released.

25. The container assembly according to claim 24, wherein the interengaging surfaces are constructed and arranged to be manually disengaged by application of manual force to the compartment against the bias of the spring, so that the spring can thereafter force the compartment outwardly from the container.

26. The container assembly according to claim 25, wherein the at least one compartment and the container have interengaging surfaces to selectively prevent the compartment from falling out of the container when pulled outwardly to a working position.

27. The container assembly of claim 1, wherein the at least one compartment is individually removable from the container and is individually configurable between the open configuration and the closed configuration.

28. A storage compartment comprising:

a pair of side walls disposed generally parallel to one another and providing a guide;

a base wall extending between the side walls, the base wall and the side walls cooperating to define, at least in part, a space within the compartment, the compartment having an opening to access the space, the base wall having an upwardly extending forward portion terminating in an upper edge;

a flexible closure slidably mounted on the guide and movable along the guide between a first position wherein it substantially covers the opening and a second position wherein it exposes the opening, the flexible closure comprising a grip member arranged to enable a user to move the flexible closure between the first position and the second position, the flexible closure having a first latch portion that engages a second latch portion on the upper edge of the base wall; and a handle non-slidably fixed to at least one of the walls, the non-slidably fixed handle providing a structure around which fingers of a user can be disposed for grasping and carrying the storage compartment, the non-slidably fixed handle being a different structure than the grip member of the flexible closure, the non-slidably fixed handle and the upwardly extending forward portion of the base wall defining a fixed finger receiving opening that receives the fingers of the user that grasps the handle.

29. The storage compartment of claim 28, wherein the base wall extends generally adjacent to the periphery of the side walls along a portion of the periphery of the side walls.

30. The storage compartment of claim 28, wherein the flexible closure can be locked when placed in the first position.

31. The storage compartment of claim 30, wherein the first latch portion of the flexible closure engages with the second latch portion on the upper edge of the base wall to lock the flexible closure in the first position.

32. The storage compartment of claim 28, wherein the flexible closure is disposed outside the space, when the flexible closure is in the open position.

33. The storage compartment of claim 28, wherein the flexible closure when placed in the open position allows the storage compartment to be nested within an identical storage compartment.

34. The storage compartment of claim 33, wherein the storage compartments are placed in alternately facing directions when nested with one another.

35. The storage compartment of claim 28, wherein the storage compartment is divided into at least two sections by at least one removable dividing wall.

36. The storage compartment of claim 35, further comprising at least one pair of grooves located on the side walls, the grooves constructed and arranged to receive the at least one removable dividing wall.

37. The storage compartment of claim 28, further comprising a wall mount that can be fixed to a wall and a mating member on the compartment configured to engage with the wall mount for mounting the compartment on a wall.

38. The storage compartment of claim 28, wherein the guide on the side walls for slidably mounting the flexible closure comprises grooves formed in the side walls along the periphery and outside the base wall.

39. The storage compartment of claim 28, wherein the flexible closure includes slats arranged in parallel to one another, the slats are connected to each other by thin portions that act as living hinges.

40. A container assembly, comprising:

a container;

at least one compartment constructed and arranged to be carried within the container, the at least one compartment comprising:

i) a pair of side walls ii) a base wall extending between the side walls, the base wall and the side walls cooperating to define, at least in part, a space within the compartment, the compartment having an opening to access the space;

iii) a closure movable between a first position in which it substantially covers the opening and a second position wherein it exposes the opening; and iv) a handle, operatively connected to at least one of the walls to enable the storage compartment to be transported;

wherein the at least one compartment and the container comprise a cooperative releasable lock assembly constructed and arranged to releasably lock the compartment within the container and the releasable lock assembly comprises a spring that biases the at least one compartment outwardly from the container when the lock assembly is released, and wherein the releasable lock assembly locks the compartment in the container when the compartment is manually forced into the container against the bias of the spring, and the spring subsequently biases a lock engaging region of the compartment into locked engagement with a lock member of the container.

41. The container assembly according to claim 40, wherein the lock assembly comprises interengaging surfaces provided on the container and the at least one compartment, and wherein the spring retains the interengaging surfaces in interengaging relationship until released.

42. The container assembly according to claim 40, wherein the interengaging surfaces are constructed and arranged to be manually disengaged by application of manual force to the compartment against the bias of the spring, so that the spring can thereafter force the compartment outwardly from the container.

43. The container assembly according to claim 40, wherein the at least one compartment and the container have interengaging surfaces to selectively prevent the compartment from falling out of the container when pulled outwardly to a working position.

44. The container assembly according to claim 40, wherein the cooperative releasable lock assembly releasably locks the compartment within the container after the compartment is pushed into the container.

45. The container assembly according to claim 40, wherein the spring is stressed when the compartment is pushed into the container and locked in the container.

* * * * *